United States Patent
Snider

(10) Patent No.: US 12,006,831 B1
(45) Date of Patent: Jun. 11, 2024

(54) DAMPER ELEMENT WITH SPRING-SUSPENDED BEARING MEMBER FOR VIBRATION DAMPENING SYSTEM FOR TURBINE BLADE

(71) Applicant: GE Infrastructure Technology LLC, Greenville, SC (US)

(72) Inventor: Zachary John Snider, Pelzer, SC (US)

(73) Assignee: GE Infrastructure Technology LLC, Greenville, SC (US)

(*) Notice: Subject to any disclaimer, the term of this patent is extended or adjusted under 35 U.S.C. 154(b) by 0 days.

(21) Appl. No.: 18/343,928

(22) Filed: Jun. 29, 2023

(51) Int. Cl.
  *F01D 25/26* (2006.01)
  *B33Y 80/00* (2015.01)
  (Continued)

(52) U.S. Cl.
  CPC .............. *F01D 25/06* (2013.01); *B33Y 80/00* (2014.12); *F01D 5/26* (2013.01); *F05D 2250/25* (2013.01);
  (Continued)

(58) Field of Classification Search
  CPC ..... F01D 5/16; F01D 5/26; F01D 5/34; F01D 5/147; F01D 5/3061; F01D 25/06; F01D 25/24; F01D 29/324; F01D 29/668; F01D 29/322; F01D 29/661; F05D 2260/96; F05D 2260/961; F05D 2250/25; F05D 2250/311; F05D 2220/32; F05D 2220/323; F05D 2230/10; F05D 2230/21; F05D 2230/239; Y02T 50/671; F16J 15/064; F16J 15/0881
  See application file for complete search history.

(56) References Cited

U.S. PATENT DOCUMENTS

| 2,999,669 A | * | 9/1961 | McGinnis | ................. F01D 5/16 416/500 |
| 5,407,321 A | * | 4/1995 | Rimkunas | ................. F01D 5/16 416/500 |

(Continued)

FOREIGN PATENT DOCUMENTS

JP  2014084676 A  5/2014

OTHER PUBLICATIONS

U.S. Appl. No. 18/344,008, Non-Final Office Action dated Mar. 22, 2024, 30 pages.

*Primary Examiner* — Woody A Lee, Jr.
*Assistant Examiner* — Joshua R Beebe
(74) *Attorney, Agent, or Firm* — Charlotte Wilson; James Pemrick; Hoffman Warnick LLC

(57) ABSTRACT

A damper element for a vibration dampening system may be used in a body opening in a rotating blade in a turbine. The damper element includes a base member having an axially fixed position within the body opening, and a spring-suspended bearing member having a spring fixedly coupled to the base member at a first end of the spring and a bearing member coupled to a second end of the spring. With the spring in an elastically extended state under influence of a centrifugal force caused by rotation of the rotating blade at higher than a predefined rotational speed, the bearing member frictionally engages a bearing surface to dampen vibration. The spring-suspended bearing member provides a friction-based vibration dampening interface that experiences a reduced impact of the centrifugal forces of the rotating blade by providing a counteracting force reduction using the spring.

20 Claims, 18 Drawing Sheets

(51) Int. Cl.
    *F01D 5/26*     (2006.01)
    *F01D 25/06*     (2006.01)

(52) U.S. Cl.
    CPC .... *F05D 2250/311* (2013.01); *F05D 2260/96* (2013.01)

(56) References Cited

U.S. PATENT DOCUMENTS

| | | | | |
|---|---|---|---|---|
| 5,820,343 | A * | 10/1998 | Kraft | F01D 5/16 416/500 |
| 6,283,707 | B1 * | 9/2001 | Chin | F01D 5/26 416/500 |
| 6,827,551 | B1 * | 12/2004 | Duffy | F01D 5/16 416/500 |
| 7,300,256 | B2 * | 11/2007 | Masserey | F01D 5/16 416/232 |
| 8,579,593 | B2 * | 11/2013 | Campbell | F01D 5/16 416/500 |
| 8,915,718 | B2 * | 12/2014 | Dolansky | F01D 5/16 416/232 |
| 9,657,717 | B2 | 5/2017 | Ollgaard et al. | |
| 10,697,303 | B2 * | 6/2020 | Blaney | F01D 25/12 |
| 10,830,067 | B2 * | 11/2020 | Kray | F01D 5/16 |
| 10,914,320 | B2 * | 2/2021 | Twelves, Jr. | F01D 5/16 |
| 11,187,089 | B2 * | 11/2021 | Wondrasek | F01D 5/22 |
| 2007/0081894 | A1 * | 4/2007 | Garner | F01D 5/16 416/97 R |
| 2013/0243587 | A1 * | 9/2013 | Yamashita | F01D 25/06 415/208.1 |
| 2021/0172325 | A1 | 6/2021 | Wondrasek et al. | |
| 2021/0254478 | A1 | 8/2021 | Chakrabarti et al. | |

\* cited by examiner

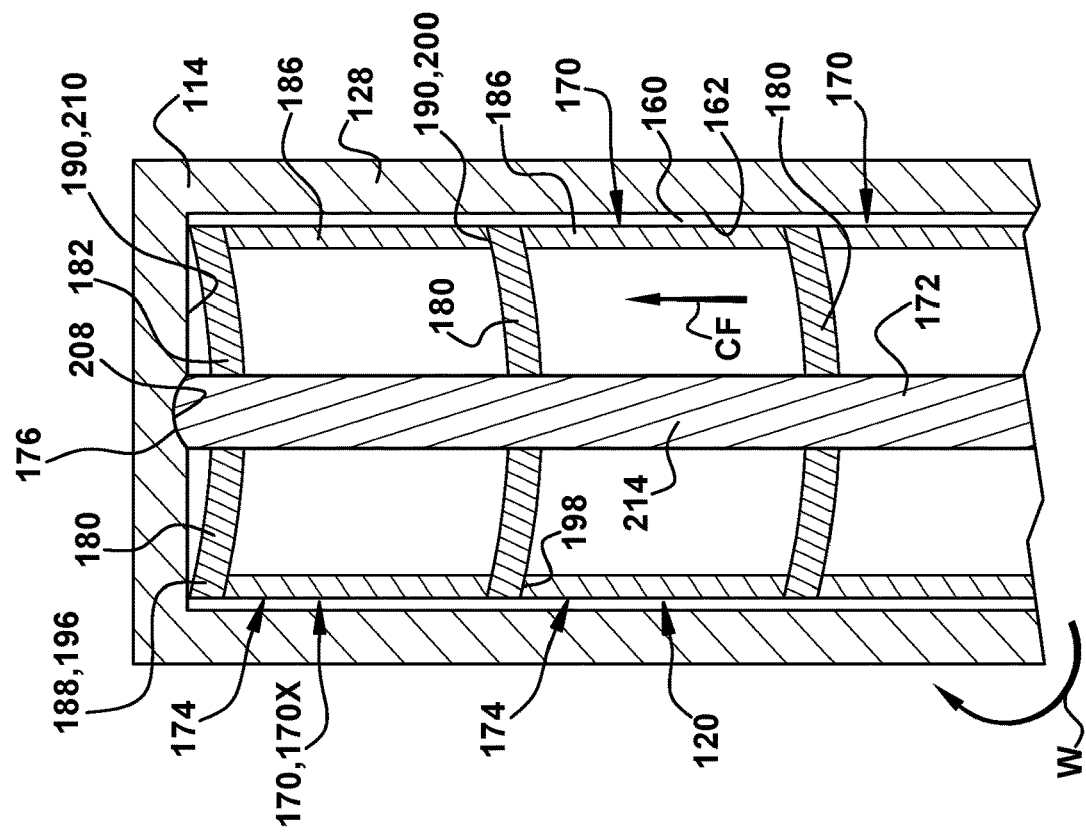
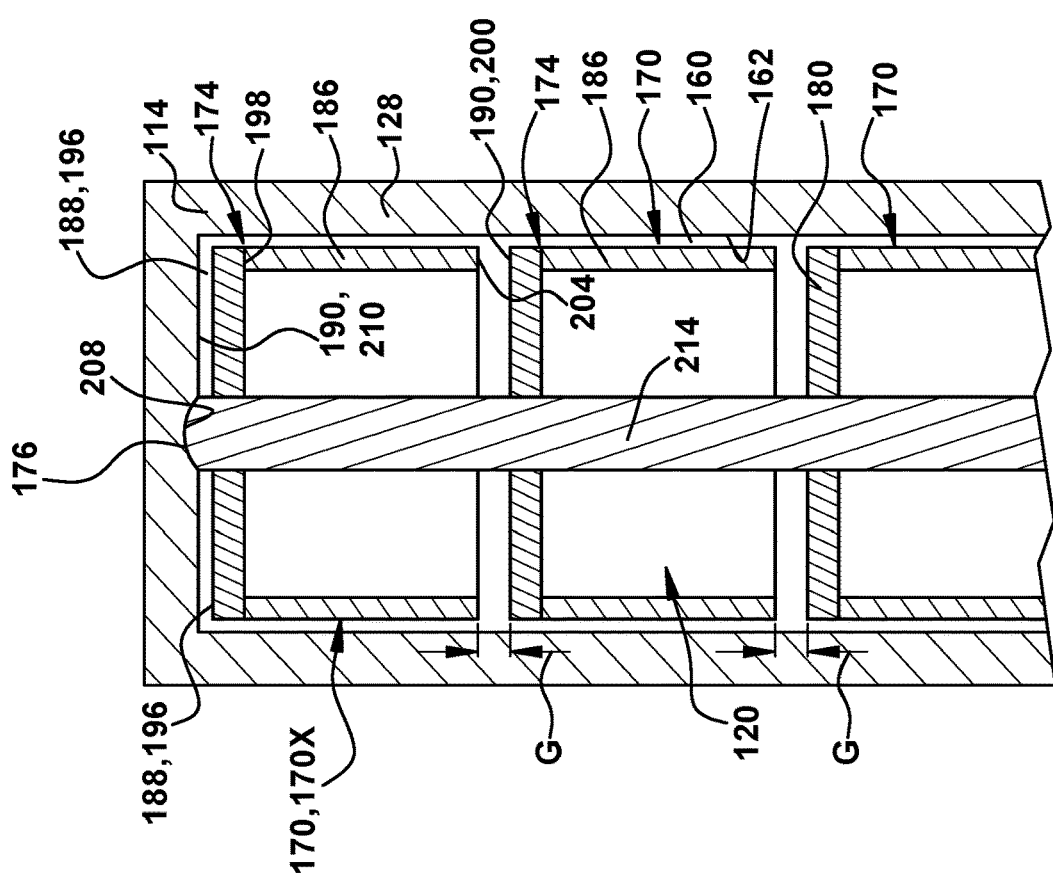
FIG. 11B
FIG. 11A

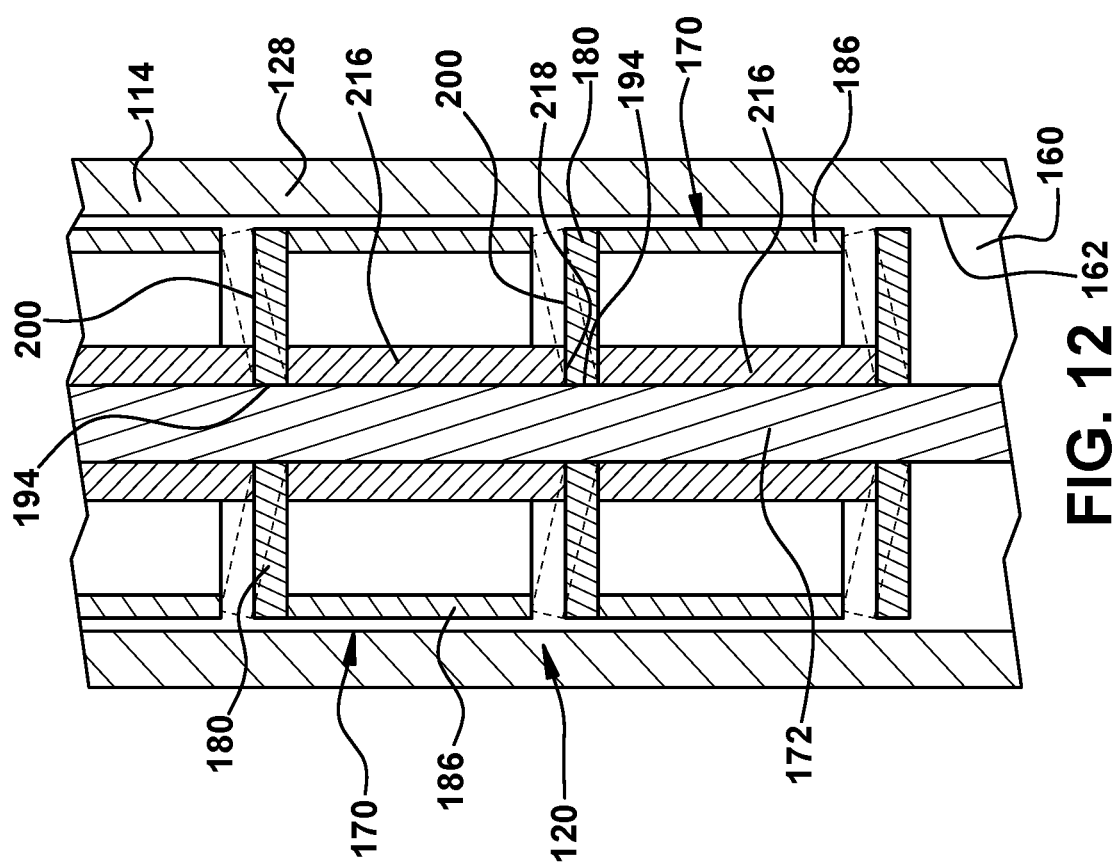

DAMPER ELEMENT WITH SPRING-SUSPENDED BEARING MEMBER FOR VIBRATION DAMPENING SYSTEM FOR TURBINE BLADE

TECHNICAL FIELD

The disclosure relates generally to dampening vibration in a rotating blade. More specifically, the disclosure relates to a vibration dampening system including a plurality of damper elements each having a spring-suspended bearing member.

BACKGROUND

One concern in turbine operation is the tendency of the rotating turbine blades to undergo vibrational stress during operation. In many installations, turbines are operated under conditions of frequent acceleration and deceleration. During acceleration or deceleration of the turbine, the airfoils of the blades are, momentarily at least, subjected to vibrational stresses at certain resonant frequencies and, in many cases, to vibrational stresses at secondary or tertiary frequencies. Nozzle airfoils experience similar vibrational stress. Variations in gas temperature, pressure, and/or density, for example, can excite vibrations throughout the rotor assembly, especially within the blade airfoils. Gas exiting upstream of the turbine and/or compressor sections in a periodic, or "pulsating," manner can also excite undesirable vibrations. When an airfoil is subjected to vibrational stress, its amplitude of vibration can readily build up to a point which may negatively affect gas turbine operations and/or component life. Previously, stacked, solid damper elements in a turbine blade have been used to dampen vibration, but the centrifugal forces can result in locking of the damper elements together, reducing or eliminating their ability to dampen vibration.

BRIEF DESCRIPTION

All aspects, examples and features mentioned below can be combined in any technically possible way.

An aspect of the disclosure provides a damper element for a vibration dampening system in a body opening in a rotating blade in a turbine, the damper element comprising: a base member having an axially fixed position within the body opening; and a spring-suspended bearing member having a spring fixedly coupled to the base member at a first end of the spring and a bearing member coupled to a second end of the spring; wherein the spring is configured to achieve an elastically extended state under influence of a centrifugal force caused by rotation of the rotating blade at higher than a predefined rotational speed, and wherein the elastically extended state of the spring causes the bearing member to frictionally engage a first bearing surface to dampen vibration.

Another aspect of the disclosure includes any of the preceding aspects, and a spring constant of the spring and a collective mass of the bearing member and the spring are configured to allow movement of the bearing member into frictional engagement with the first bearing surface from a position out of engagement with the first bearing surface in response to the centrifugal force caused by rotation of the rotating blade at higher than the predefined rotational speed.

Another aspect of the disclosure includes any of the preceding aspects, and the base member has a first side and a second side, and the spring includes a plurality of partially helical coils extending from the first side of the base member to the bearing member.

Another aspect of the disclosure includes any of the preceding aspects, and each partially helical coil includes a first end coupled to the first side of the base member at a first circumferential location relative to a center axis of the base member, and a second end coupled to the bearing member at a second circumferential location relative to the center axis of the base member that is different than the first circumferential location.

Another aspect of the disclosure includes any of the preceding aspects, and the first end of each partially helical coil is coupled to the first side of the base member at a perpendicular angle, and the second end of each partially helical coil is coupled to the bearing member at a perpendicular angle.

Another aspect of the disclosure includes any of the preceding aspects, and further comprising a positioning member having a first end and a second end, the positioning member coupled to and extending from the first side of the base member at the first end of the positioning member, the positioning member extending adjacent the spring.

Another aspect of the disclosure includes any of the preceding aspects, and the damper element is a first damper element of a plurality of identical damper elements arranged in a stacked configuration; wherein the first bearing surface engaged by the bearing member of the first damper element is on the second side of the base member of an adjacent damper element, and wherein the second end of the positioning member is configured to frictionally engage with a second bearing surface on the second side of the base member of the adjacent damper element to dampen vibration.

Another aspect of the disclosure includes any of the preceding aspects, and the positioning member is configured to axially fix the position of the base member within the body opening relative to adjacent damper elements of the plurality of damper elements, and the spring positions the bearing member: at a distance from the first bearing surface of the adjacent damper element with the rotating blade rotating at lower than the predefined rotational speed and the spring in a not-fully extended state; and frictionally engaging the first bearing surface of the adjacent damper element to dampen vibration with the rotating blade rotating at higher than the predefined rotational speed and the spring in the elastically extended state.

Another aspect of the disclosure includes any of the preceding aspects, and the first bearing surface is located on one of: a side of the base member of an adjacent damper element and an end surface of the body opening in the rotating blade.

Another aspect of the disclosure includes any of the preceding aspects, and the base member, the spring, and the bearing member are additively manufactured and integrally coupled.

Another aspect of the disclosure includes a vibration dampening system for a rotating blade of a turbine, the vibration dampening system comprising: a plurality of stacked damper elements for positioning in a body opening defined in the rotating blade, each damper element including: a base member having an axially fixed position within the body opening; and a spring-suspended bearing member having a spring fixedly coupled to the base member at a first end of the spring and a bearing member coupled to a second end of the spring; wherein, with the spring in an elastically extended state under influence of a centrifugal force caused by rotation of the rotating blade at higher than a predefined rotational speed, the bearing member frictionally engages a first bearing surface to dampen vibration.

Another aspect of the disclosure includes any of the preceding aspects, and a spring constant of the spring and a collective mass of the bearing member and the spring are configured to allow movement of the bearing member into frictional engagement with the first bearing surface from a position out of engagement with the first bearing surface in response to the centrifugal force caused by rotation of the rotating blade at higher than the predefined rotational speed.

Another aspect of the disclosure includes any of the preceding aspects, and the base member has a first side and a second side, and the spring includes a plurality of partially helical coils extending from the first side of the base member to the bearing member.

Another aspect of the disclosure includes any of the preceding aspects, and each partially helical coil includes a first end coupled to the first side of the base member at a first circumferential location relative to a center axis of the base member, and a second end coupled to the bearing member at a second circumferential location relative to the center axis of the base member that is different than the first circumferential location.

Another aspect of the disclosure includes any of the preceding aspects, and the first end of each partially helical coil is coupled to the first side of the base member at a perpendicular angle, and the second end of each partially helical coil is coupled to the bearing member at a perpendicular angle.

Another aspect of the disclosure includes any of the preceding aspects, and each damper element further comprises a positioning member having a first end and a second end, the positioning member coupled to and extending from a first side of the base member at the first end of the positioning member, the positioning member extending adjacent the spring.

Another aspect of the disclosure includes any of the preceding aspects, and the first bearing surface frictionally engaged by a first damper element is on a second side of the base member of a second adjacent damper element opposite the first side of the base member of the second adjacent damper element, and wherein the positioning member of the first damper element is configured to frictionally engage with a second bearing surface of the second adjacent damper element on the second side of the base member of the second adjacent damper element to dampen vibration, the positioning member of the first damper element axially fixing the position of the base member of the second adjacent damper element within the body opening and the spring of the first damper element positioning the bearing member of the first damper element: at a distance from the first bearing surface with the rotating blade rotating at lower than the predefined rotational speed and the spring in a not-fully extended state; and frictionally engaging the first bearing surface to dampen vibration with the rotating blade rotating at higher than the predefined rotational speed and the spring in the elastically extended state.

Another aspect of the disclosure includes any of the preceding aspects, and the first bearing surface is located on one of a side of the base member of an adjacent damper element and an end surface of the body opening in the rotating blade.

Another aspect of the disclosure relates to a vibration dampening system for a rotating blade in a turbine, the vibration dampening system comprising: a plurality of stacked damper elements for positioning in a body opening defined in the rotating blade, each damper element including: a base member having a first side and a second side; a spring having a first end and a second end, the spring coupled to the first side of the base member at the first end of the spring; a bearing member coupled to the second end of the spring; and a positioning member having a first end and a second end, the positioning member coupled to the first side of the base member at the first end of the positioning member and extending adjacent the spring, and wherein the spring positions the bearing member: at a distance from a first bearing surface with the rotating blade rotating at lower than a predefined rotational speed and the spring in a not-fully extended state; and frictionally engaging the first bearing surface to dampen vibration with the spring in an elastically extended state under influence of a centrifugal force caused by rotation of the rotating blade at higher than the predefined rotational speed.

Another aspect of the disclosure includes any of the preceding aspects, and, for all damper elements except a radially outermost damper element of the plurality of stacked damper elements in the body opening, the first bearing surface includes the second side of the base member of an adjacent damper element.

Another aspect of the disclosure includes any of the preceding aspects, and, for the radially outermost damper element of the plurality of stacked damper elements in the body opening, the first bearing surface includes an end surface of the body opening defined in the rotating blade.

Another aspect of the disclosure includes a damper element for a vibration dampening system in a body opening in a rotating blade in a turbine, the damper element comprising: a base member having an axially fixed position within the body opening; and a spring-suspended bearing member including a disc spring fixedly coupled to the base member at a center of the disc spring, and a bearing member coupled to a first side of the disc spring at an outer perimeter thereof, wherein the bearing member extends radially distal from the first side of the disc spring; wherein, with the disc spring in an elastically extended state under influence of a centrifugal force caused by rotation of the rotating blade at higher than a predefined rotational speed, the bearing member frictionally engages a first bearing surface to dampen vibration.

Another aspect of the disclosure includes any of the preceding aspects, and a spring constant of the disc spring and a collective mass of the bearing member and the disc spring are configured to allow movement of the disc spring into frictional engagement with the first bearing surface from a position out of engagement with the first bearing surface in response to the centrifugal force caused by rotation of the rotating blade at higher than the predefined rotational speed.

Another aspect of the disclosure includes any of the preceding aspects, and the damper element is a first damper element of a plurality of identical damper elements arranged in a stacked configuration; wherein the first bearing surface engaged by the bearing member of the first damper element is one of: a second side of the disc spring of a second adjacent damper element opposite the first side of the disc spring of the second adjacent damper element, and an end surface of the body opening.

Another aspect of the disclosure includes any of the preceding aspects, and the base member includes an elongated body having a first end surface thereof configured to mate with a second end surface of the base member of an adjacent damper element.

Another aspect of the disclosure includes any of the preceding aspects, and the base member further includes a positioning collar concentrically arranged with the elongated body and abutting a second side of the disc spring.

Another aspect of the disclosure includes any of the preceding aspects, and the base member, the disc spring, and the bearing member are additively manufactured and integrally coupled.

Another aspect of the disclosure includes a vibration dampening system for a rotating blade, the vibration dampening system comprising: a plurality of damper elements for positioning in a stacked arrangement in a body opening defined in the rotating blade, each damper element including: a base member having an axially fixed position within the body opening; and a spring-suspended bearing member including a disc spring fixedly coupled to the base member at a center of the disc spring, and a bearing member coupled to a first side of the disc spring at an outer perimeter thereof, wherein the bearing member extends radially distal from the first side of the disc spring; wherein, with the disc spring in an elastically extended state under influence of a centrifugal force caused by rotation of the rotating blade at higher than a predefined rotational speed, the bearing member frictionally engages a first bearing surface to dampen vibration.

Another aspect of the disclosure includes any of the preceding aspects, and a spring constant of the disc spring and a collective mass of the bearing member and the disc spring are configured to allow movement of the bearing member into frictional engagement with the first bearing surface from a position out of engagement with the first bearing surface in response to the centrifugal force caused by rotation of the rotating blade at higher than the predefined rotational speed.

Another aspect of the disclosure includes any of the preceding aspects, and the plurality of damper elements comprises a first damper element and a second adjacent damper element; wherein the first bearing surface engaged by the bearing member of the first damper element is one of: a second side of the disc spring of the second adjacent damper element opposite the first side of the disc spring of the second adjacent damper element, and an end surface of the body opening.

Another aspect of the disclosure includes any of the preceding aspects, and the base member includes an elongated body having a first end surface thereof configured to mate with a second end surface of the base member of an adjacent damper element.

Another aspect of the disclosure includes any of the preceding aspects, and the base member further includes a positioning collar concentrically arranged with the elongated body and abutting a second side of the disc spring.

Another aspect of the disclosure includes any of the preceding aspects, and the plurality of damper elements is additively manufactured and integrally coupled.

Another aspect of the disclosure includes any of the preceding aspects, and the base member, the disc spring, and the bearing member of each damper element are additively manufactured and integrally coupled.

Another aspect of the disclosure includes any of the preceding aspects, and the bearing member of a radially outermost damper element of the plurality of damper elements in the body opening frictionally engages with an end surface of the body opening defined in the rotating blade.

Another aspect of the disclosure includes a vibration dampening system for a rotating blade in a turbine, the vibration dampening system comprising: a plurality of stacked damper elements for positioning in a body opening defined in the rotating blade, each damper element including: a base member having an axially fixed position within the body opening; and a spring-suspended bearing member including a disc spring fixedly coupled to the base member at a center of the disc spring, and a bearing member coupled to a first side of the disc spring at an outer perimeter thereof, wherein the bearing member extends radially distal from the first side of the disc spring; wherein the disc spring of a first damper element of the plurality of damper elements positions the bearing member of the first damper element: at a distance from a first bearing surface with the rotating blade rotating at lower than a predefined rotational speed and the disc spring in a not-fully extended state; and frictionally engaging the first bearing surface to dampen vibration with the disc spring of the first damper element in an elastically extended state under influence of a centrifugal force caused by rotation of the rotating blade at higher than the predefined rotational speed.

Another aspect of the disclosure includes any of the preceding aspects, and the first bearing surface is one of: a second side of the disc spring of a second adjacent damper element opposite the first side of the disc spring of the second adjacent damper element, and an end surface of the body opening.

Another aspect of the disclosure includes any of the preceding aspects, and the base member further includes a positioning collar abutting a second side of the disc spring.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 11A shows a cross-sectional view of a vibration dampening system including a plurality of damper elements in a first position, according to other embodiments of the disclosure;

FIG. 11B shows a cross-sectional view of a vibration dampening system including a plurality of damper elements in a second position, according to other embodiments of the disclosure;

FIG. 12 shows a cross-sectional view a vibration dampening system including a plurality of damper elements, according to another embodiment of the disclosure;

Figure 1:
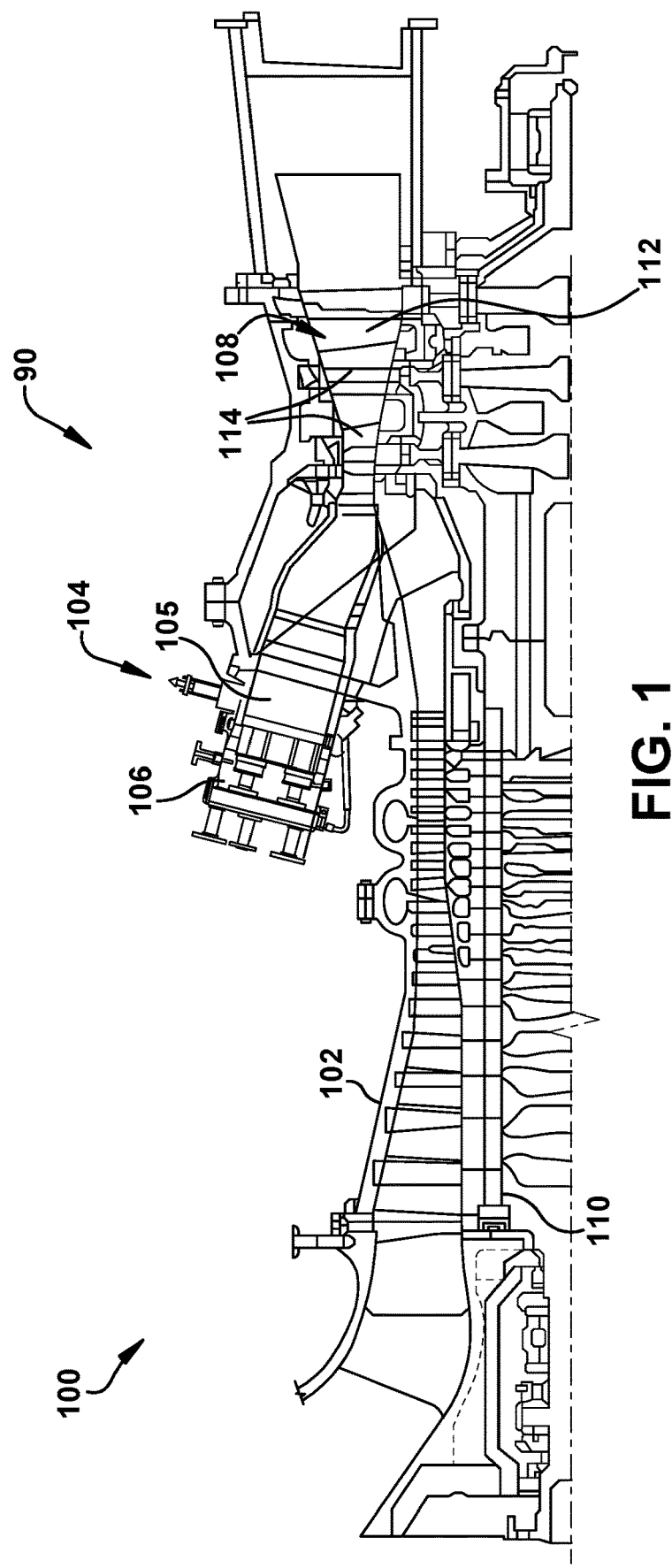
FIG. 1 shows a cross-sectional view of an illustrative turbomachine in the form of a gas turbine system including a turbine section.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within a turbine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. It is often required to describe parts that are disposed at different radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to a center axis of a damper element or the center axis of the turbine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently described component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the disclosure provide a damper element and a vibration dampening system for a turbine blade. The damper element(s) for the vibration dampening system may be used in a body opening in a rotating blade in a turbine. The damper elements include a base member having an axially fixed position within the body opening, and a spring-suspended bearing member having a spring fixedly coupled to the base member at a first end of the spring and a bearing member coupled to a second end of the spring. With the spring in an elastically extended state under influence of a centrifugal force caused by rotation of the rotating blade at higher than a predefined rotational speed, the bearing member frictionally engages a bearing surface to dampen vibration. The spring-suspended bearing member provides a first, friction-based vibration dampening interface that experiences a reduced impact of the centrifugal forces (i.e., gravitational force equivalent (g-forces)) created by the rotating blade by providing a counteracting force reduction using the spring. Where the rotating blade rotates at lower than the predefined rotational speed, the spring-suspended bearing member remains disengaged from the bearing surface.

In certain embodiments, the damper element can be provided with the spring-suspended bearing member alone such that any friction-based vibration dampening provided occurs under less than the full impact of the centrifugal forces. In other embodiments, the damper element may include the spring-suspended bearing member to provide a first friction-based vibration dampening interface without the full impact of centrifugal forces, and other secondary mechanisms that provide second friction-based vibration dampening interfaces that experience all of the centrifugal force of the rotating blade. In this latter embodiment, where the centrifugal forces exceed the capability of one or more of the secondary mechanisms to continue friction-based vibration dampening, the spring-suspended bearing member still provides the first, friction-based vibration dampening interface.

The damper elements can be customized in terms of overall size, spring constant, bearing member and/or spring mass, among other characteristics, to function under defined centrifugal forces existing at a predefined rotational speed of the rotating blades. The predefined rotational speed and, hence, centrifugal forces, may be user defined. In one non-limiting example, the predefined rotational speed may be 75% of the rotational speed of the rotating blades at full load of the turbine. In this manner, the vibration dampening can occur during acceleration of the rotating blade, e.g., early in a turbine startup process, and deceleration of the rotating blade, e.g., during a turbine shutdown process. The centrifugal forces observed by the frictionally engaging surfaces of the first friction-based vibration dampening interface remain lower than the full centrifugal forces even at 100% rotational speed at full load of the turbine. Hence, this vibration dampening may occur despite the other vibration dampening interfaces being inoperative due to the centrifugal force making them inoperative. The vibration dampening system reduces blade vibration with a simple arrangement and does not add much extra mass to the blade. Accordingly, the vibration dampening system and damper elements do not increase overall centrifugal force to the blade tip end or require a change in blade configuration.

Referring to the drawings, FIG. 1 is a cross-sectional view of an illustrative machine including a turbine(s) to which teachings of the disclosure can be applied. In FIG. 1, a turbomachine 90 in the form of a combustion turbine or gas turbine (GT) system 100 (hereinafter, "GT system 100") is shown. GT system 100 includes a compressor 102 and a combustor 104. Combustor 104 includes a combustion region 105 and a fuel nozzle section 106. GT system 100 also includes a turbine 108 (i.e., an expansion turbine or turbine section) and a common compressor/turbine shaft 110 (hereinafter referred to as "rotor 110"). GT system 100 may be, for example, a 7HA.03 engine, commercially available from General Electric Company, Greenville, S.C. The present disclosure is not limited to any one particular GT system and may be implemented in connection with other engines including, for example, the other HA, F, B, LM, GT, TM and E-class engine models of General Electric Company and engine models of other companies. More importantly, the teachings of the disclosure are not necessarily applicable to only a turbine in a GT system and may be applied to practically any type of industrial machine or other turbine, e.g., steam turbines, jet engines, compressors (as in FIG. 1), turbofans, turbochargers, etc. Hence, reference to turbine 108 of GT system 100 is merely for descriptive purposes and is not limiting.

Figure 2:
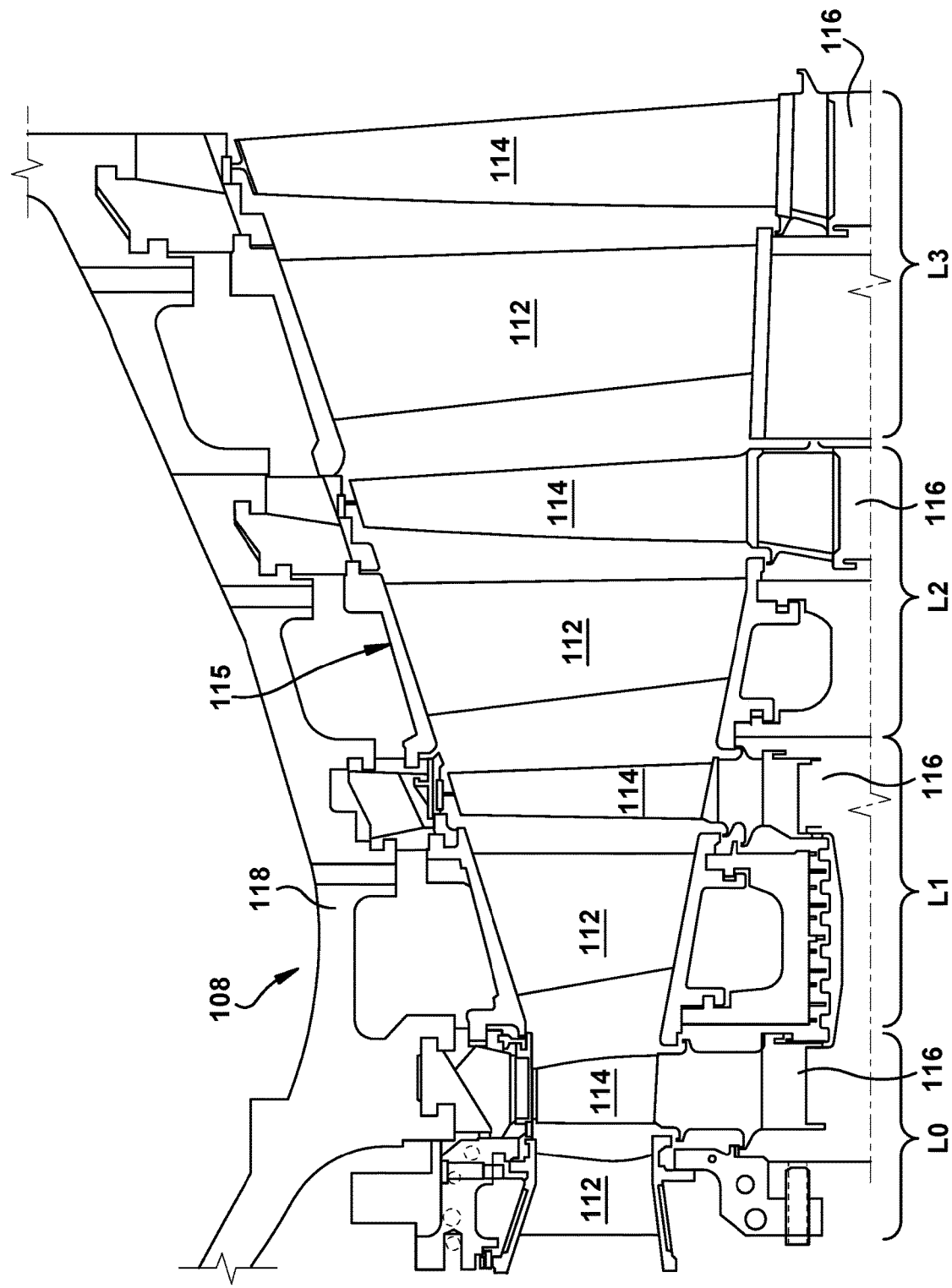
FIG. 2 shows a cross-sectional view of a portion of an illustrative turbine section as may be used with the turbomachine of FIG. 1, according to embodiments of the disclosure.

FIG. 2 shows a cross-sectional view of an illustrative portion of turbine 108. In the example shown, turbine 108 includes four stages L0-L3 that may be used with GT system 100 in FIG. 1. The four stages are referred to as L0, L1, L2, and L3. Stage L0 is the first stage and is the smallest (in a radial direction) of the four stages. Stage L1 is the second stage and is disposed adjacent the first stage L0 in an axial direction. Stage L2 is the third stage and is disposed adjacent the second stage L1 in an axial direction. Stage L3 is the fourth, last stage and is the largest (in a radial direction). It is to be understood that four stages are shown as one example only, and each turbine may have more or less than four stages.

A plurality of stationary turbine vanes or nozzles 112 (hereafter "nozzle 112," or "nozzles 112") may cooperate with a plurality of rotating turbine blades 114 (hereafter "blade 114," or "blades 114") to form each stage L0-L3 of turbine 108 and to define a portion of a working fluid path through turbine 108. Blades 114 in each stage are coupled to rotor 110 (FIG. 1), e.g., by a respective rotor wheel 116 that couples them circumferentially to rotor 110 (FIG. 1). That is, blades 114 are mechanically coupled in a circumferentially spaced manner to rotor 110, e.g., by rotor wheels 116. A static nozzle section 115 includes a plurality of nozzles 112 mounted to a casing 118 and circumferentially spaced around rotor 110 (FIG. 1). It is recognized that blades 114 rotate with rotor 110 (FIG. 1) and thus experience centrifugal force, while nozzles 112 are static.

With reference to FIGS. 1 and 2, in operation, air flows through compressor 102, and pressurized air is supplied to combustor 104. Specifically, the pressurized air is supplied to fuel nozzle section 106 that is integral to combustor 104. Fuel nozzle section 106 is in flow communication with combustion region 105. Fuel nozzle section 106 is also in flow communication with a fuel source (not shown in FIG. 1) and channels fuel and air to combustion region 105. Combustor 104 ignites and combusts fuel to produce combustion gases. Combustor 104 is in flow communication with turbine 108, within which thermal energy from the combustion gas stream is converted to mechanical rotational energy by directing the combusted fuel (e.g., working fluid) into the working fluid path to turn blades 114. Turbine 108 is rotatably coupled to and drives rotor 110. Compressor 102 may also be rotatably coupled to rotor 110. At least one end of rotor 110 may extend axially away from compressor 102 or turbine 108 and may be attached to a load or machinery (not shown), such as, but not limited to, a generator, a load compressor, and/or another turbine.

Figure 3:
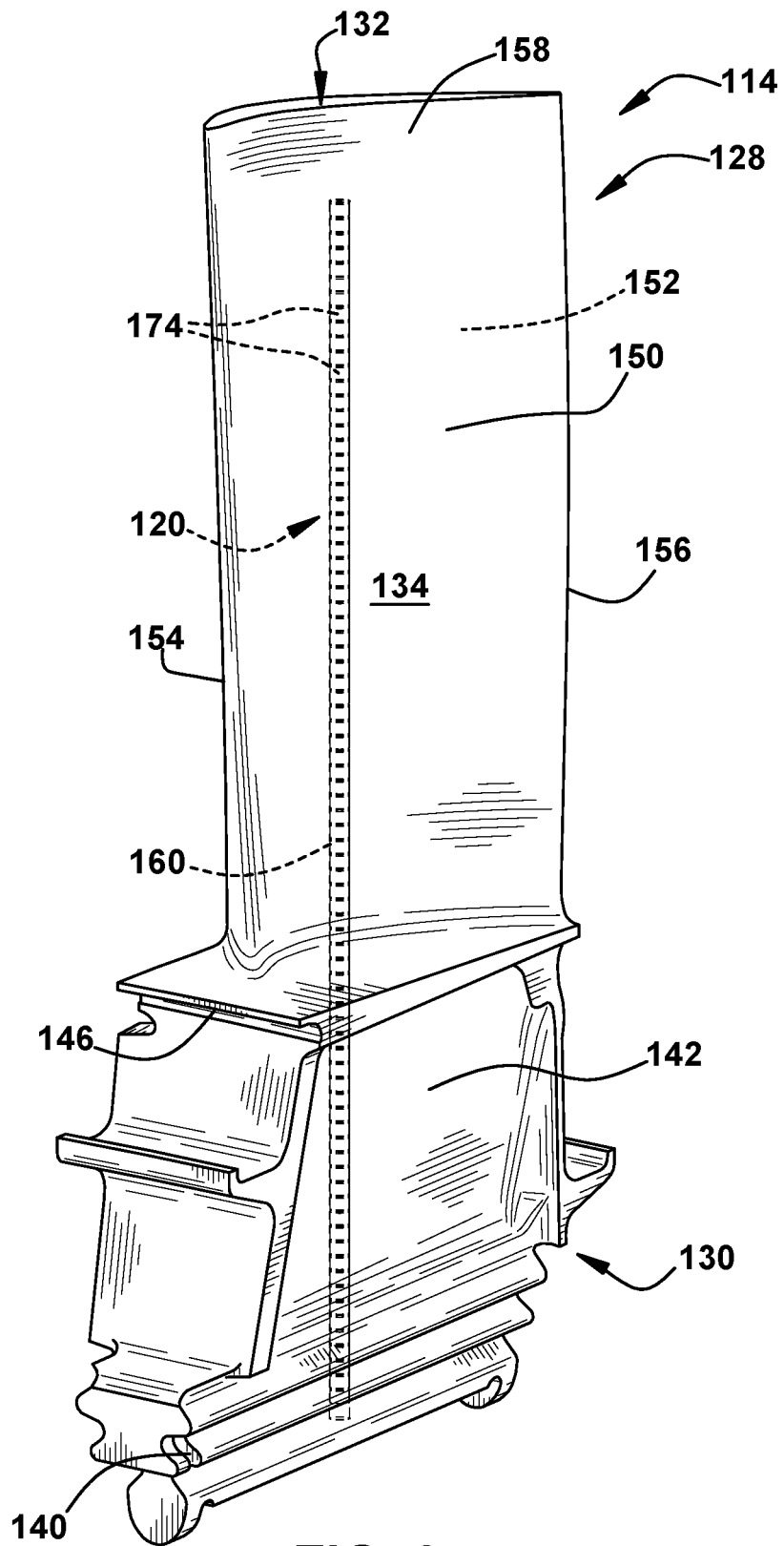
FIG. 3 shows a perspective view of an illustrative turbine blade including a vibration dampening system, according to embodiments of the disclosure.
Figure 4:
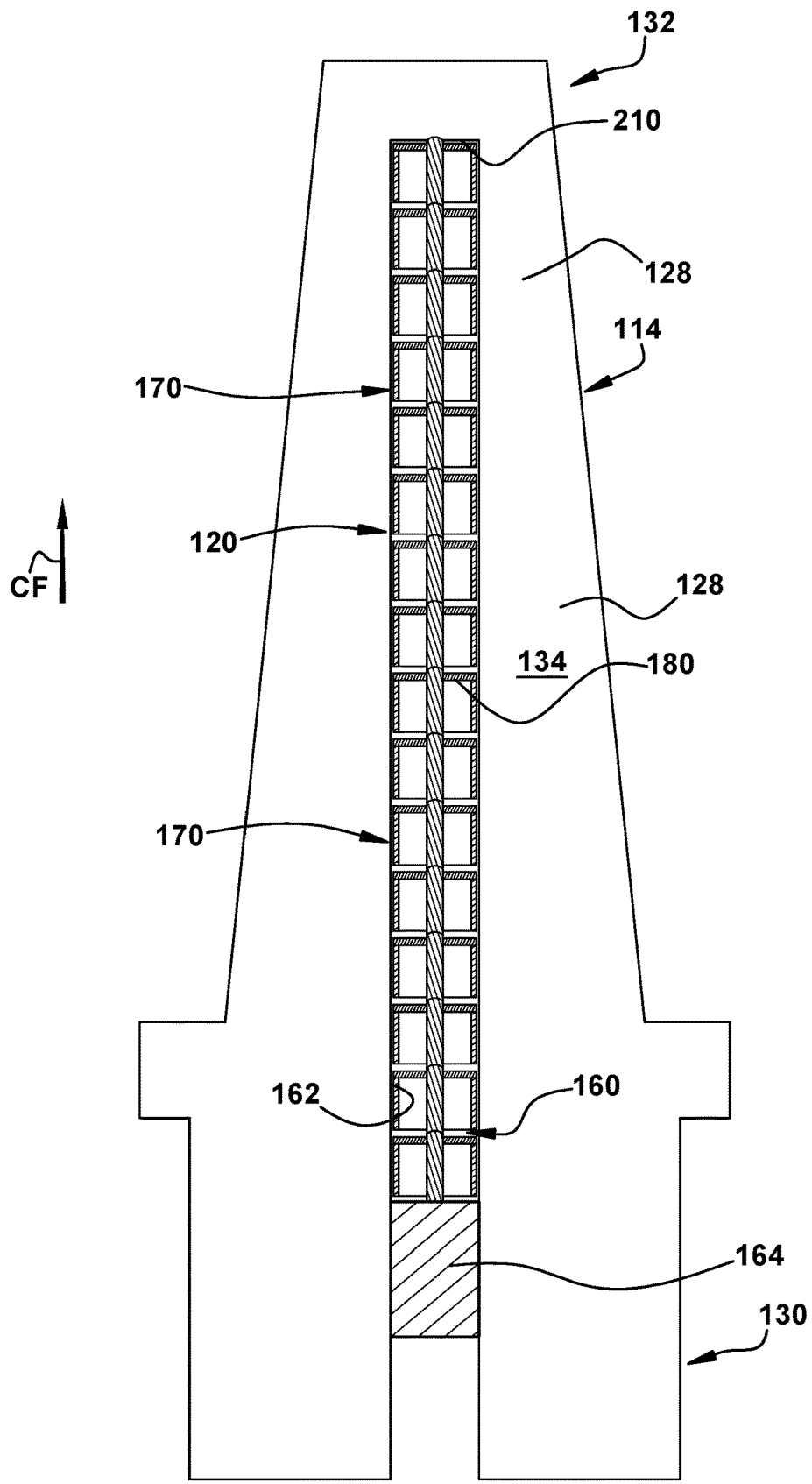
FIG. 4 shows a schematic cross-sectional view of a turbine blade having a vibration dampening system including a plurality of damper elements, according to embodiments of the disclosure.
Figure 5:
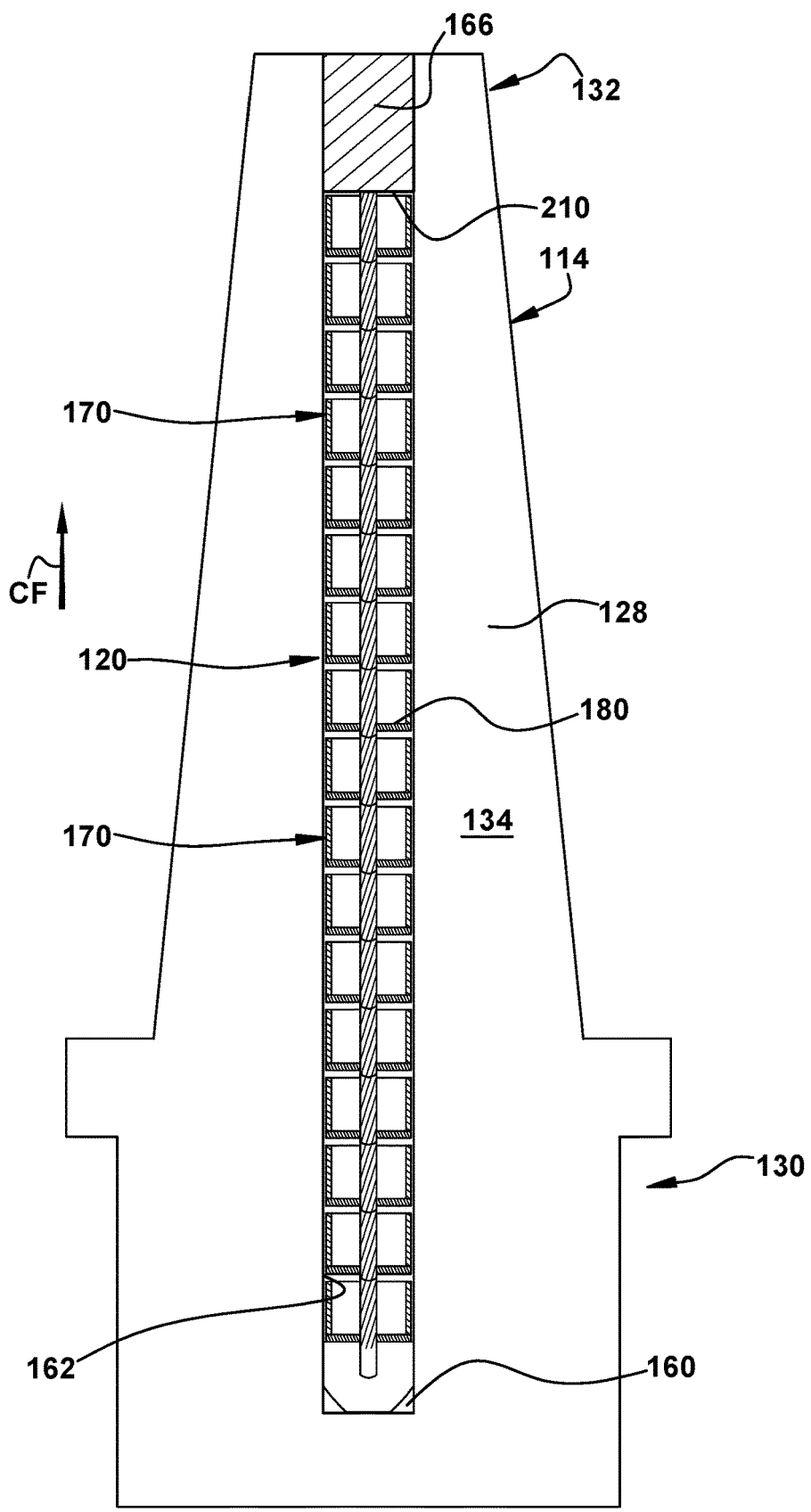
FIG. 5 shows a schematic cross-sectional view of a turbine blade having a vibration dampening system including a plurality of damper elements, according to embodiments of the disclosure.

FIG. 3 shows a perspective view of a (rotating) blade 114 of the type in which embodiments of a vibration dampening system 120 of the present disclosure may be employed. As will be described herein, FIGS. 4 and 5 show schematic cross-sectional views of a blade 114 including vibration dampening system 120, according to various embodiments of the disclosure.

Referring to FIG. 3, each blade 114 includes a body 128 having a base end 130, a tip end 132, and an airfoil 134 extending between base end 130 and tip end 132. As shown in FIG. 3, blade 114 includes a dovetail 140 at base end 130 by which blade 114 attaches to a rotor wheel 116 (FIG. 2) of rotor 110 (FIG. 1). Base end 130 of blade 114 may further include a shank 142 that extends between dovetail 140 and a platform 146. Platform 146 is disposed at the junction of airfoil 134 and shank 142 and defines a portion of the inboard boundary of the working fluid path (FIG. 2) through turbine 108.

It will be appreciated that airfoil 134 in blade 114 is the active component of blade 114 that intercepts the flow of working fluid and induces rotor 110 (FIG. 1) to rotate. It will be seen that airfoil 134 of blade 114 includes a concave pressure side (PS) outer sidewall 150 and a circumferentially or laterally opposite convex suction side (SS) outer sidewall 152 extending axially between opposite leading and trailing edges 154, 156, respectively. Sidewalls 150 and 152 also extend in the radial direction from base end 130 (i.e., platform 146 for blade 114) to tip end 132 (i.e., a tip end 158 for blade 114). Note, in the example shown, although blade 114 does not include a tip shroud, teachings of the disclosure are equally applicable to a blade including a tip shroud at tip end 158. Blade 114 shown in FIG. 3 is illustrative only, and the teachings of the disclosure can be applied to any variety of blade.

During operation of a turbine, blades 114 may be excited into vibration by a number of different forcing functions. For example, variations in working fluid temperature, pressure, and/or density can excite vibrations throughout the rotor assembly, especially within the airfoils and/or tips of the blades 114. Gas exiting upstream of the turbine and/or compressor sections in a periodic, or "pulsating," manner can also excite undesirable vibrations. The present disclosure aims to reduce the vibration of a rotating turbine blade 114 without significant change of blade design.

FIGS. 4 and 5 each show a schematic cross-sectional view of blade 114 including vibration dampening system 120 according to embodiments of the disclosure. Vibration dampening system 120 for blade 114 may include a body opening 160 extending through body 128 at least partially between tip end 132 and base end 130 thereof and through airfoil 134. Body opening 160 may extend part of the distance between base end 130 and tip end 132, or it may extend through one or more of base end 130 or tip end 132. Body opening 160 may be defined in any part of any structure of body 128. Where body 128 includes an internal partition wall (not shown), for example, for defining a cooling circuit therein, body opening 160 may be defined as an internal cavity in the partition wall in body 128. Body opening 160 generally extends radially in body 128. However, some angling, and perhaps curving, of body opening 160 relative to a radial extent of body 128 is possible. Body opening 160 has an inner surface 162.

As shown in FIG. 4, body opening 160 may originate at base end 130 of blade 114, or, as shown in FIG. 5, it may originate at tip end 132 of blade 114. More particularly, as shown in FIG. 4, body opening 160 may be open in base end 130 and terminate in tip end 132, or, as shown in FIG. 5, it may be open in tip end 132 and terminate in base end 130. The open end may assist in assembly of vibration dampening system 120 in blade 114 and may allow retrofitting of the system into an existing blade. Where body opening 160 extends through base end 130 as shown in FIG. 4, a closure member 164 for closing body opening 160 may be provided. Where body opening 160 extends through tip end 132, as shown in FIG. 5, a closure member 166 for body opening 160 may be provided. In addition to closing body opening 160, closure members 164, 166 also prevent removal of vibration dampening system 120 from body opening 160.

Vibration dampening system 120 for blades 114 may include a plurality of damper elements 170 (FIGS. 6-12), 270 (FIGS. 13-18B). Damper elements for vibration dampening system 120 are positioned in body opening 160 in rotating blade 114 in turbine 108. The damper elements can take a variety of forms according to embodiments of the disclosure. Generally, the damper elements include a base member having an axially fixed position within the body opening, and a spring-suspended bearing member having a spring fixedly coupled to the base member at a first end of the spring and a bearing member coupled to a second end of the spring. With the spring in an elastically extended state under influence of a centrifugal force caused by rotation of the rotating blade at higher than a predefined rotational speed, the bearing member frictionally engages a first bearing surface to dampen vibration, creating the noted first friction-based vibration dampening interface. As will be further described, the first friction-based vibration dampening interface experiences a reduced impact from the centrifugal forces created by the rotating blade by providing a counteracting force reduction using a spring.

Figure 7:
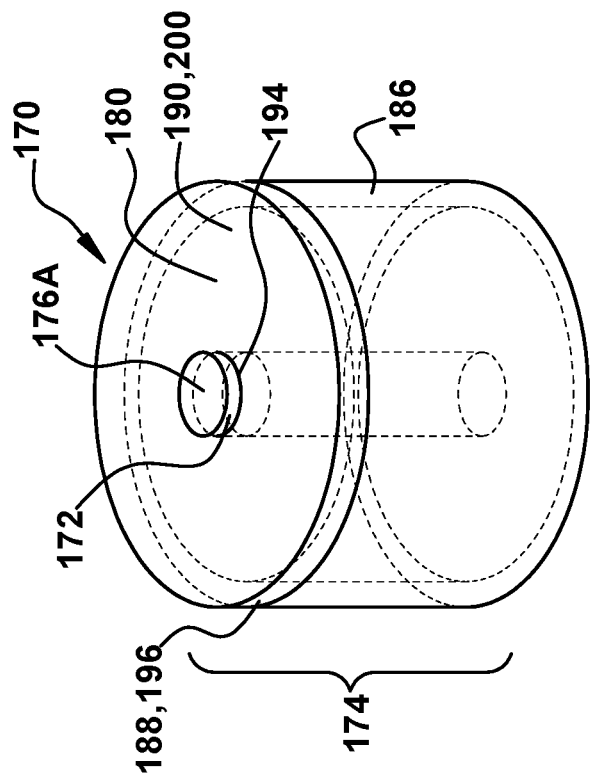
FIG. 7 shows a perspective view of a damper element of FIG. 6, according to embodiments of the disclosure.
Figure 6:
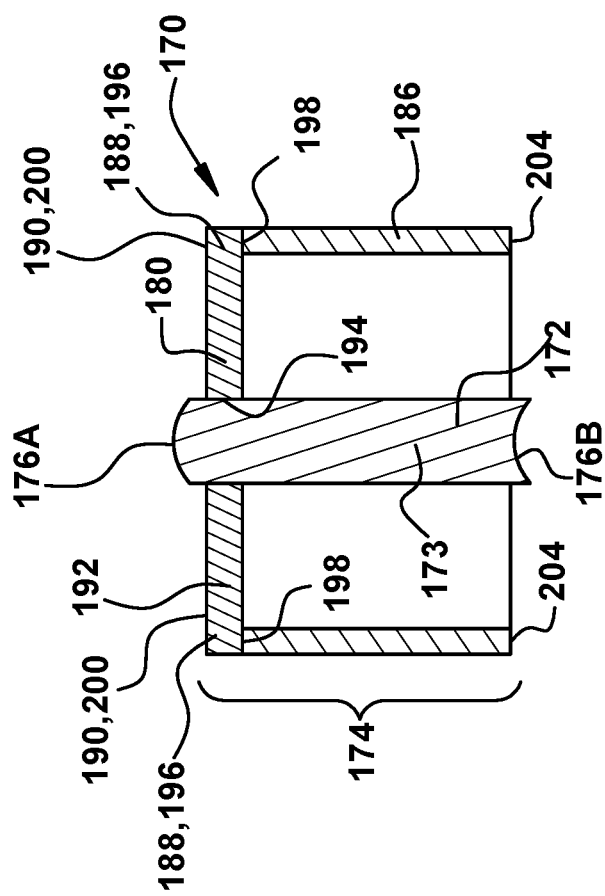
FIG. 6 shows a cross-sectional view of a damper element as shown in the vibration dampening system of FIGS. 4 and 5, according to embodiments of the disclosure.
Figure 8B:
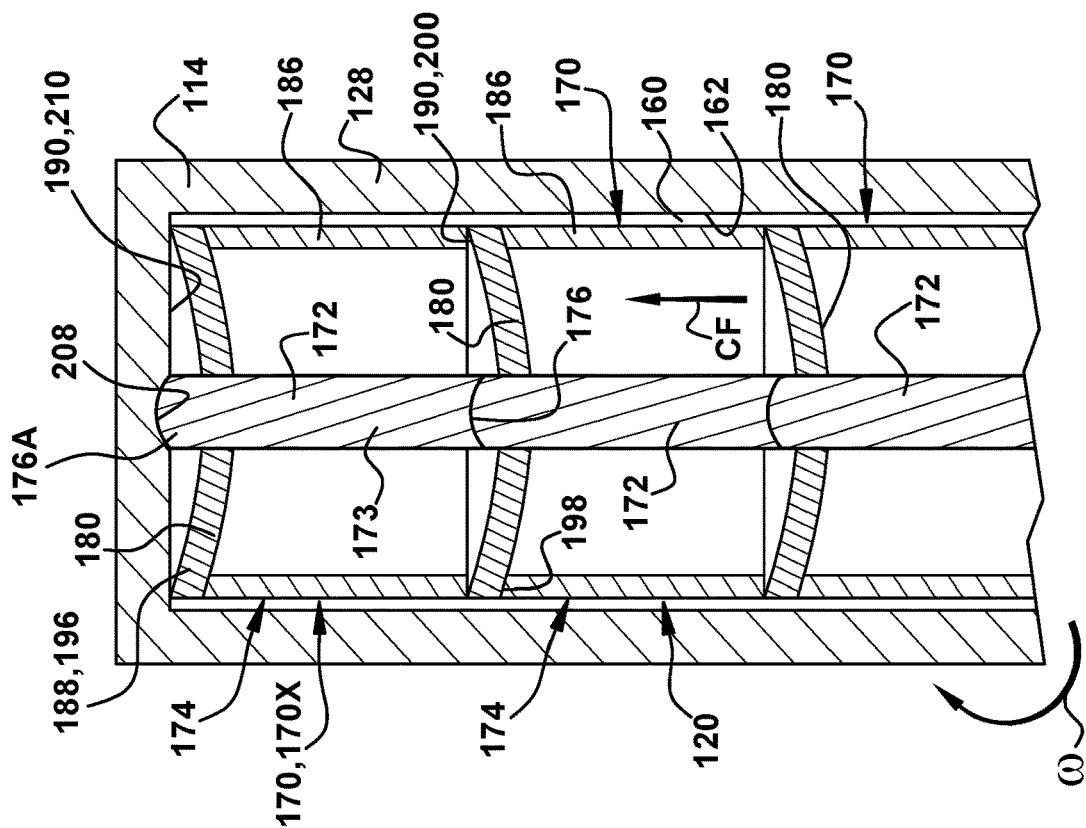
FIG. 8B shows a cross-sectional view of a vibration dampening system including a plurality of damper elements in a second position, according to embodiments of the disclosure.
Figure 8A:
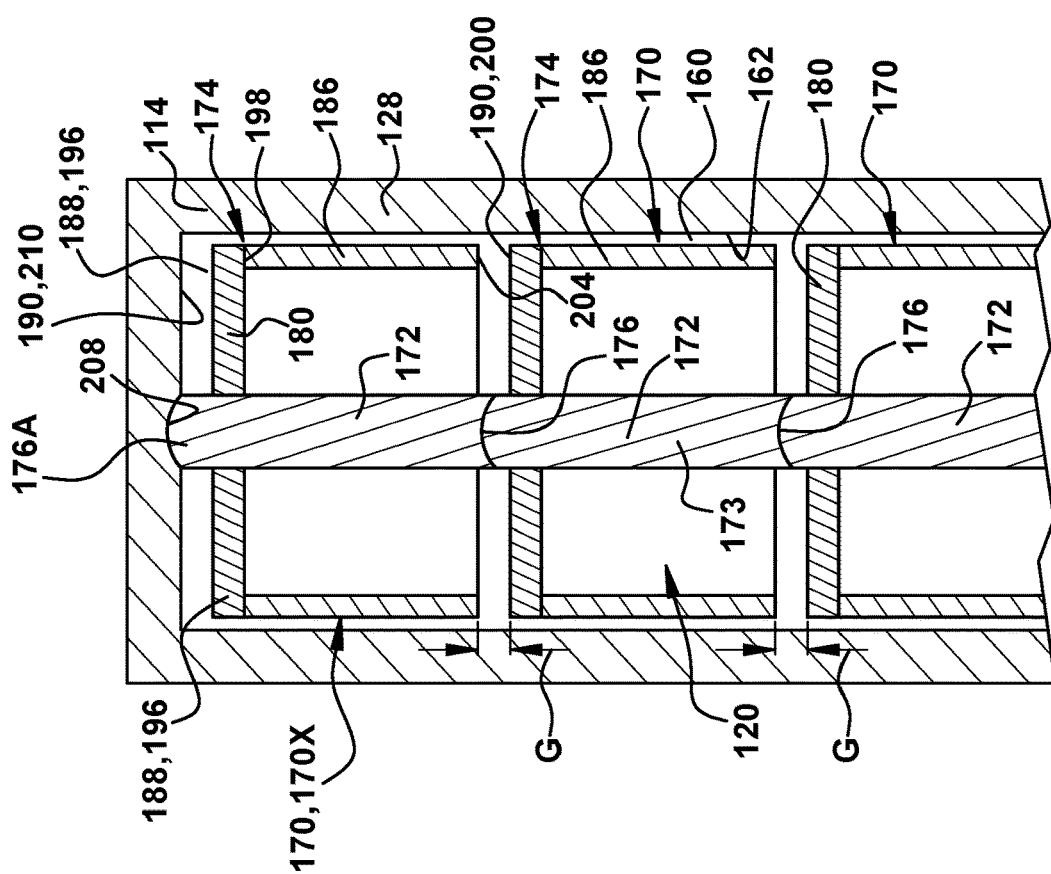
FIG. 8A shows a cross-sectional view of a vibration dampening system including a plurality of damper elements in a first position, according to embodiments of the disclosure.

FIG. 6 shows a cross-sectional view, and FIG. 7 shows a perspective view of a damper element 170, according to certain embodiments of the disclosure. FIG. 8A shows a cross-sectional view of three stacked damper elements 170 in a first position in body opening 160 of blade 114, and FIG. 8B shows a cross-sectional view of three stacked damper elements 170 in a second position. Any number of damper elements 170 may be used in a vibration dampening system 120, according to embodiments of the disclosure.

As shown in FIGS. 6, 7 and 8A-B, each damper element 170 may include a base member 172 having an axially fixed position within body opening 160 (FIGS. 8A-B). Base member 172 may have a cross-sectional shape configured to match or interface with that of body opening 160, e.g., circular or other shape. As will be further described, base member 172 does not engage inner surface 162 of body opening 160 except base member 172 of a radially outermost damper element 170X (as a single damper element or the end of a stack of damper elements) engages with an end surface 210 of body opening 160. In this manner, base member(s) 172 are axially fixed in position in body opening 160 by the base member(s)' collective interaction over a length of body opening 160 and under the influence of a centrifugal force. Base member 172 may include an elongated body 173 (FIG. 6) having a first end surface 176A (FIGS. 6-7 only) thereof configured to mate with a second end surface 176B (FIG. 6 only) of base member 172 of an adjacent damper element 170. That is, base members 172 may include mating end surfaces 176 (FIGS. 8A-B) configured to fixedly position base members 172 in body opening 160 in a stacked arrangement. Mating end surfaces 176 may also provide a friction-based vibration dampening interface that dampens vibration therebetween under the full influence of centrifugal force CF (FIG. 8B), creating the noted second friction-based vibration dampening interfaces. In the example shown, mating end surfaces 176 are mating curved concave and convex surfaces, e.g., like a dome. Other shapes are also possible that allow relative frictional movement such as but not limited to: conical concave/convex, square concave/convex, etc. The second friction-base vibration dampening may occur at each set of mating surfaces 176 in stacked damper elements 170.

As noted, base members 172 are axially fixed in position in body opening 160 by the base members' collective interaction over a length of body opening 160 and the base member of a radially outermost damper element 170X engaging with an end surface 210 of body opening 160. As shown in FIG. 8B, base member 172 of radially outermost damper element 170X may also have mating end surface 176A that mates with a mating surface 208 in end surface 210 of body opening 160. Mating end surfaces 176A, 208 may provide the endmost interface of second friction-based, vibration dampening interfaces that dampen vibration therebetween under the full influence of centrifugal force CF (FIG. 8B). In the example shown, mating end surfaces 176A, 208 are also mating curved concave and convex surfaces, e.g., like a dome. Other shapes are also possible as noted herein. It is also noted that the mating surfaces 176, 208 need not be identical at each interface along stacked damper elements 170.

Damper element 170 also includes a spring-suspended bearing member 174 (FIGS. 6-7). In FIGS. 6, 7, 8A-B, spring-suspended bearing member 174 includes a disc spring 180 fixedly coupled to base member 172 at a center 194 of disc spring 180 and a bearing member 186 coupled to a first side 198 of disc spring 180 at an outer perimeter thereof, i.e., relative to center 194. Bearing member 186 may include any element capable of frictionally engaging a first bearing surface 190 to dampen vibration. As will be described, a location of first bearing surface 190 can vary depending on the particular damper element 170. In FIGS. 6, 7, 8A-B, disc spring 180 includes any form of disc spring, also known alternatively as, for example: a Belleville washer, Belleville spring, cupped spring washer, coned-disc spring, conical spring washer, etc. While shown in a planar, initial configuration, disc spring 180 can also have any frustoconical arrangement, among other shapes. Disc spring 180 can have any form capable of providing a desired spring action or spring constant.

Disc spring 180 has a center 194 coupled to base member 172, and an outer perimeter 196 having a first side 198 (FIG. 6) coupled to bearing member 186. Disc spring 180 also includes a second side 200 opposite first side 198. Center 194 of disc spring 180 may be fixedly coupled to elongated body 173 of base member 172 in any now known or later developed fashion. For example, where center 194 includes an opening, center 194 of disc spring 180 may be welded or brazed to base member 172. Alternatively, disc spring 180 and base member 172 may be additively manufactured as integral parts, along with bearing member 186. Bearing member 186 is coupled to first side 198 of disc spring 180 and extends radially distal from first side 198 of disc spring 180, i.e., relative to a turbine axis. In certain embodiments, shown in FIGS. 6, 7, 8A-B, bearing member 186 may extend radially inward, i.e., toward base end 130 of blade 114 from first side 198 of disc spring 180.

Figure 9:
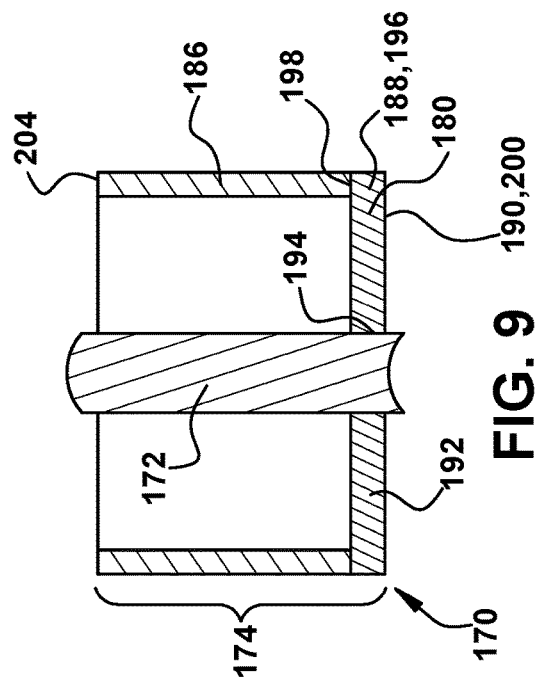
FIG. 9 shows a cross-sectional view of a damper element, according to other embodiments of the disclosure.

FIG. 9 shows a cross-sectional view of spring-suspended bearing member 174 in which bearing member 186 also extends radially distal from first side 198 of disc spring 180, but radially outward from first side 198 of disc spring 180, i.e., toward tip end 132 (FIGS. 4-5) of blade 114. (In FIG. 9, first and second sides 198, 200 are switched in position compared to FIGS. 6-8B.) Disc spring 180 can have a thickness that is different than bearing member 186. The thickness of disc spring 180 may vary over its radial extent to provide any desired spring action or spring constant.

In certain embodiments, damper elements 170 are stacked together in body opening 160. Any number of damper elements 170 may be stacked in body opening 160. FIGS. 8A-B show three damper elements 170 stacked in body opening 160. FIG. 8A shows damper elements 170 in a position in which blade 114 is not rotating, or alternately is rotating at a rotational speed w (omega) that is lower than a predefined rotational speed at which damper elements 170 are operative. In this first position, disc springs 180 are in a not-fully extended state, and a gap G exists between a first bearing surface 190 (in the form of second side 200 of disc springs 180) and an end surface 204 of bearing member 186. A "not-fully extended state" of disc spring 180 may be a relaxed state in which disc spring 180 is not extended (as occurs when rotating blade 114 is not rotating) or a partially extended state in which disc spring 180 is partially extended (as occurs when rotating blade 114 has sufficient rotational speed to create a centrifugal force CF to cause disc spring 180 to partially extend but not enough to have bearing member 186 frictionally engage first bearing surface 190).

In contrast, FIG. 8B shows damper elements 170 in a second position in which disc springs 180 are in an elastically extended state under influence of a centrifugal force CF caused by rotating blade 114 rotating above a predefined rotational speed. In this position, disc springs 180 are elastically extended (radially outward toward tip end 132 (FIGS. 4-5)) at outer perimeters 196 thereof, causing gap G (FIG. 8A) to disappear, and causing bearing member 186 to frictionally engage first bearing surface 190 to dampen vibration. As shown, for stacked damper elements 170 other than a radially outermost damper element 170X, first bearing surface 190 may be second side 200 of an adjacent damper element's disc spring 180. That is, first bearing surface 190 includes second side 200 of disc spring 180 opposite from first side 198. Here, end surface 204 of bearing member 186 frictionally engages second side 200 of disc spring 180 of an adjacent damper element 170 to dampen vibration. For radially outermost damper element 170X, second side 200 of its disc spring 180 frictionally engages a first bearing surface 190 that is part of an end surface 210 of body opening 160, i.e., a radially outer end surface 210. In view of the foregoing, it will be recognized that first bearing surface 190 may be located on one of: second side 200 of disc spring 180; first side 198; and/or end surface 210 of body opening 160 in rotating blade 114. An "elastically extended state" indicates disc spring 180 has extended sufficiently to have bearing member 186 frictionally engaging first bearing surface 190 but may not be fully extended due to the travel distance of bearing member 186 being limited by first bearing surface 190.

In certain embodiments, base member 172, disc spring 180 and bearing member 186 are additively manufactured and integrally coupled. In other embodiments, base member 172, disc spring 180 and bearing member 186 may be separately formed from any material (metal, ceramic, etc.) that gives the desired stiffness properties. These members can be fixedly coupled together using any now known or later developed process, e.g., welding, brazing, fasteners, etc.

Figure 10:
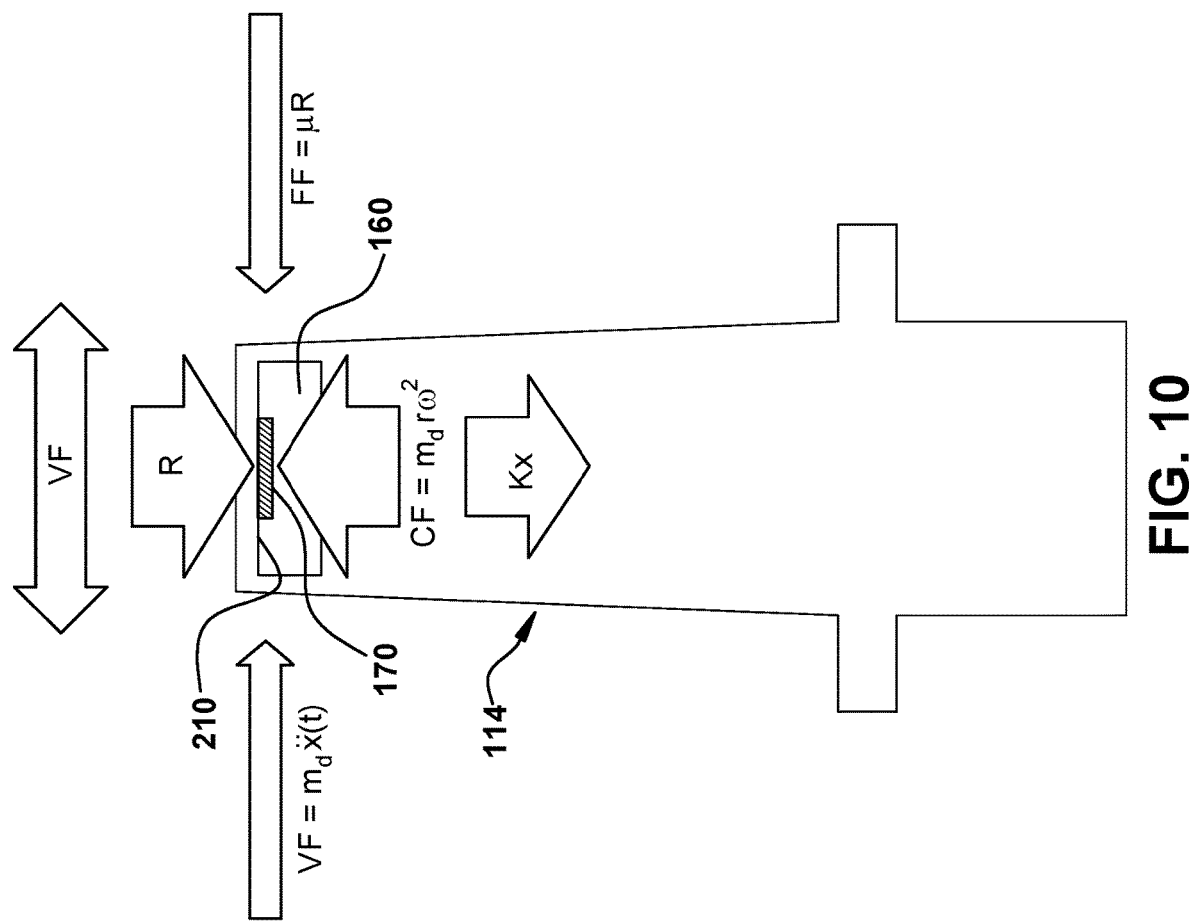
FIG. 10 shows a schematic view of a rotating blade and damper element illustrating relevant forces in the operation of a vibration dampening system, according to embodiments of the disclosure.

A spring constant of disc spring 180 and a collective mass of bearing member 186 and disc spring 180 are configured to allow movement of disc spring 180 into frictional engagement with first bearing surface 190 (FIG. 8B) from a position out of engagement (FIG. 8A) with first bearing surface 190 in response to centrifugal force CF caused by rotation of rotating blade 114 at higher than the predefined rotational speed. FIG. 10 shows a schematic diagram illustrating the forces involved in operation of damper elements 170. The rotational speed ω for a given rotating blade 114 creates a particular centrifugal force CF, i.e., gravitational force equivalent (g-force), on rotating blade 114. More specifically, centrifugal force CF equals damper mass ma times radius (general location of damper element 170 mass relative to turbine axis) times the square of rotational speed w, i.e., $CF=m_a r\omega^2$. Damper element(s) 170 also impart a reactionary force R on an end surface 210 of body opening 160 that is equal to the centrifugal force CF, i.e., R=CF. As rotating blade 114 rotates at rotational speed w, it also creates a lateral vibratory force VF. Vibratory force VF can be simplified as equal to the damper mass ma times a simple harmonic vibration, sine function $\ddot{x}(t)$, i.e., $VF=m_d \ddot{x}(t)$. A friction force FF that resists vibration dampening of parts of damper element 170 is equal to the reaction force R times a friction coefficient μ (mu) of the relevant frictionally engaging surfaces (e.g., 190 or 198, 210), i.e., FF=μR or FF=μCF. If damper element 170 is to have frictional vibration dampening occur between surfaces thereof, e.g., first bearing surface 190 and bearing member 186, the surfaces need to slide back and forth to dampen vibration. In order for this to occur, vibratory force VF must be greater than friction force FF, i.e., VF>FF. Hence, vibratory force VF must be greater than a product of the centrifugal force CF and a friction coefficient μ of the surfaces, i.e., VF>μCF.

Disc spring 180 in damper elements 170, according to embodiments of the disclosure, imparts a reactive force Kx that constructively reduces centrifugal force CF (and reactionary force R) to reduce the amount of vibratory force VF required to start vibration dampening. That is, disc spring 180 reduces the force between vibration dampening surfaces (e.g., first bearing surface 190 and bearing member 186) to reduce the amount of vibratory force VF required to begin vibration dampening. Damper elements 170 can be custom sized to operate at different centrifugal forces CF, radii location, vibration frequency, and rotational speed, among other factors.

In FIGS. 8A-B, damper elements 170 are illustrated as separate entities that are stacked together, e.g., by mating surfaces 176 of base members 172. In other embodiments, shown in FIG. 11A-B, base member 172 may be a one-piece base member with a one-piece elongated body 214 (rather than multiple elongated bodies 173). Disc springs 180 are fixedly coupled to elongated body 214. In this case, plurality of damper elements 170, i.e., base members 172, are integral to one another. While FIGS. 11A-B show the FIG. 6 embodiment in which bearing member 186 extends radially inward relative to a respective disc spring 180, the FIGS. 11A-B embodiment is equally applicable to the teachings of FIG. 9 in which bearing member 186 extends radially outward relative to a respective disc spring 180.

In FIGS. 6, 7, 8A-B, 9 and 11A-B, as noted, disc springs 180 are fixedly coupled to base members 172 or base member 272, e.g., by welding or via integral additive manufacture. FIG. 12 shows a cross-sectional view of another embodiment in which disc spring 180 can be, but is not necessarily, fixedly coupled to base members 172, 214. In FIG. 12, base member 172 further includes a positioning collar 216, which may be concentrically arranged with elongated body 173 thereof. In this example, a single base member 172 having a one-piece elongated body 214 is illustrated. Positioning collar 216 thus may axially position respective disc springs 180 relative to base member 172 without disc springs 180 being fixedly coupled to base member 172. Positioning collar 216 can be a tubular member that slides onto base member 172, or can be integral with base member 172. In any event, an end 218 of positioning collar 216 may abut second side 200 of disc springs 180 adjacent center 194 to position disc springs 180 and to provide a surface upon which disc springs 180 can elastically extend.

Figure 13:
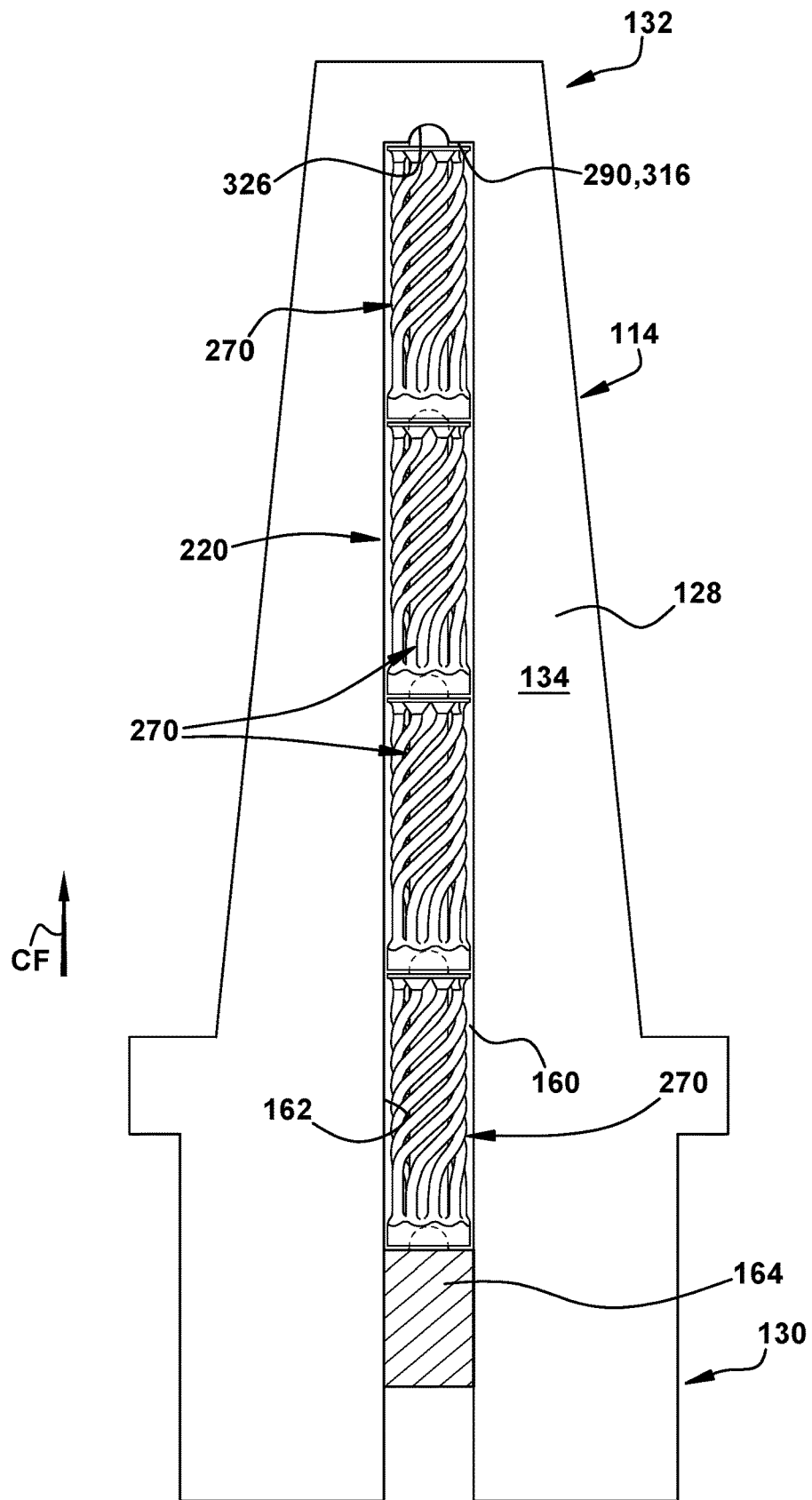
FIG. 13 shows a schematic cross-sectional view of a turbine blade having a vibration dampening system including a plurality of damper elements, according to other embodiments of the disclosure.
Figure 14:
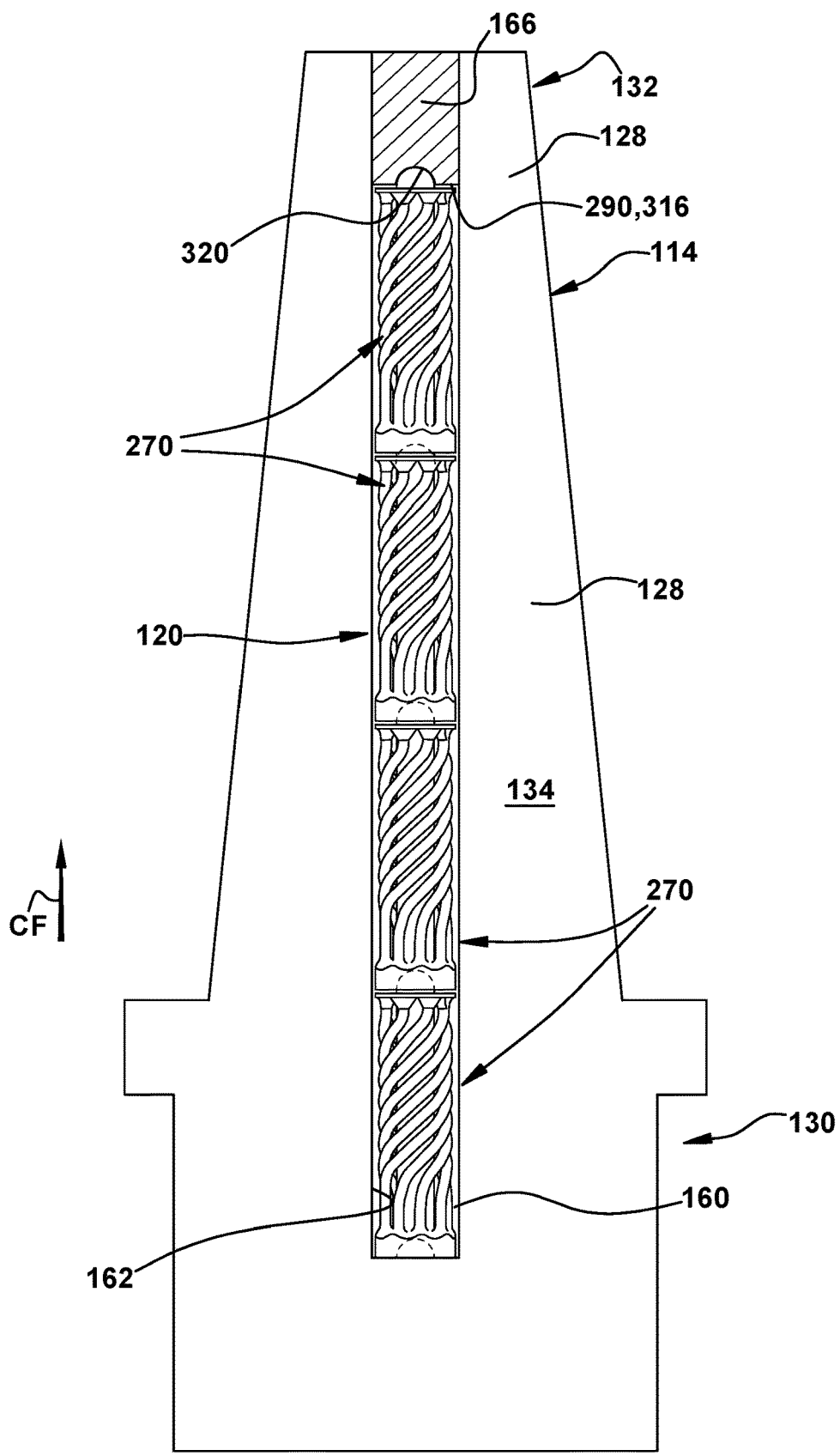
FIG. 14 shows a schematic cross-sectional view of a turbine blade having a vibration dampening system including a plurality of damper elements, according to other embodiments of the disclosure.

FIGS. 13-17B show a vibration dampening system 220 including a different spring-suspended bearing member 274, according to other embodiments of the disclosure. FIGS. 13 and 14 each show a schematic cross-sectional view of blade 114 including vibration dampening system 220 according to embodiments of the disclosure. Vibration dampening system 220 for blade 114 may include body opening 160 extending through body 128 as previously described herein. As shown in FIG. 13, body opening 160 may originate at base end 130 of blade 114, or, as shown in FIG. 14, it may originate at tip end 132 of blade 114. Where body opening 160 extends through base end 130, as shown in FIG. 13, closure member 164 for closing body opening 160 may be provided. Where body opening 160 extends through tip end 132, as shown in FIG. 14, closure member 166 for body opening 160 may be provided. In addition to closing body opening 160, closure members 164, 166 also prevent removal of vibration dampening system 120 from body opening 160.

Figure 15:
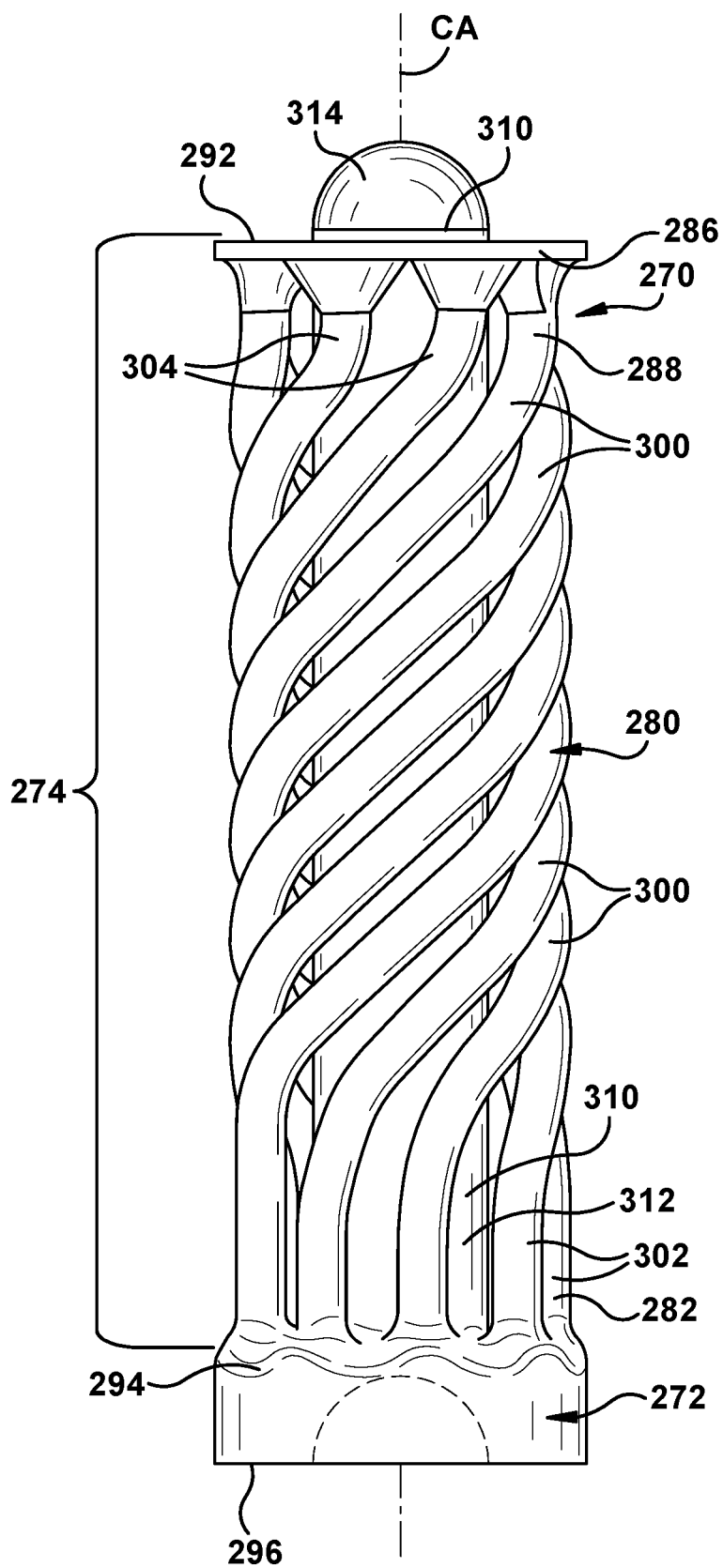
FIG. 15 shows a side view of a damper element as shown in the vibration dampening systems of FIGS. 13 and 14, according to embodiments of the disclosure.
Figure 16:
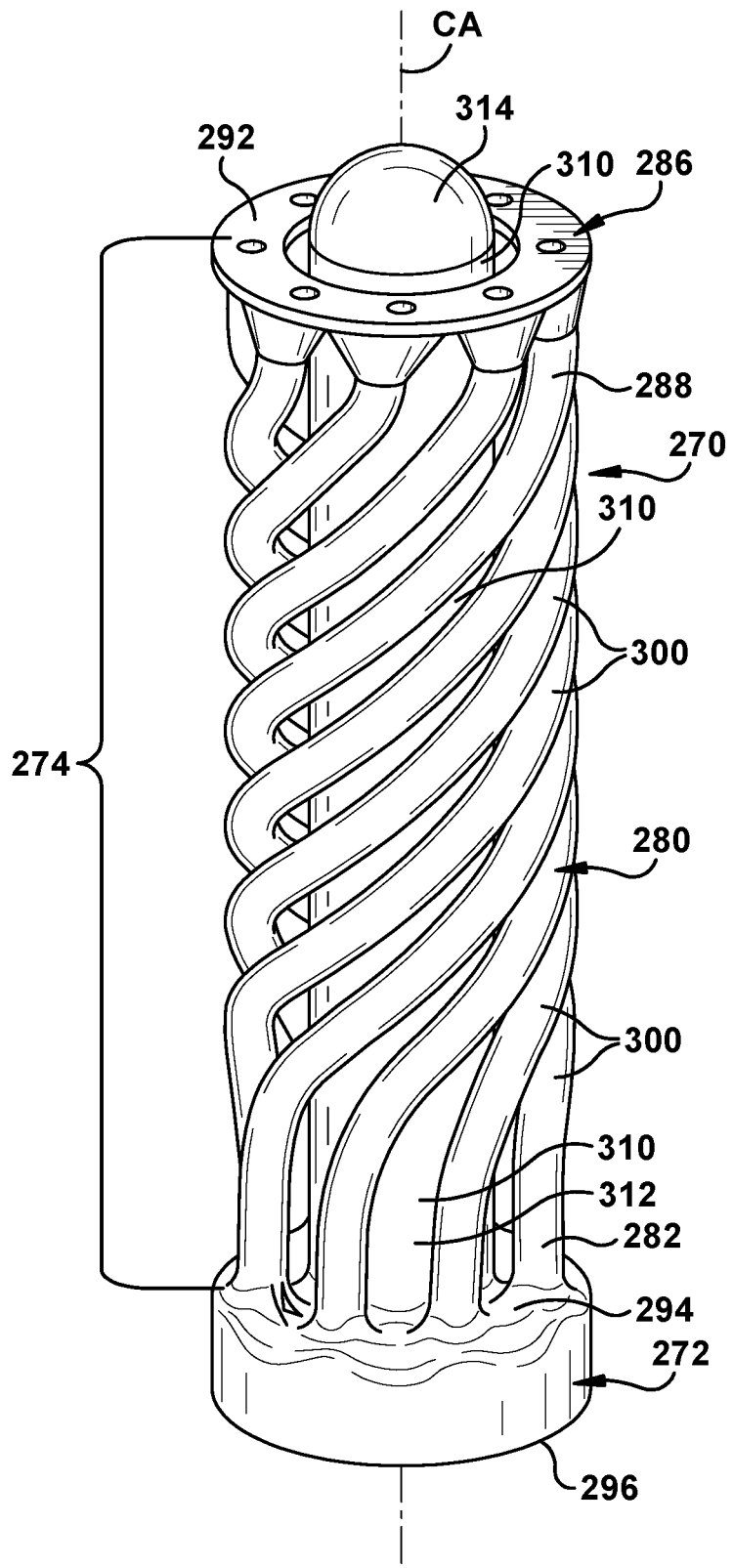
FIG. 16 shows a perspective view of a damper element of FIG. 15, according to additional embodiments of the disclosure.
Figure 17A:
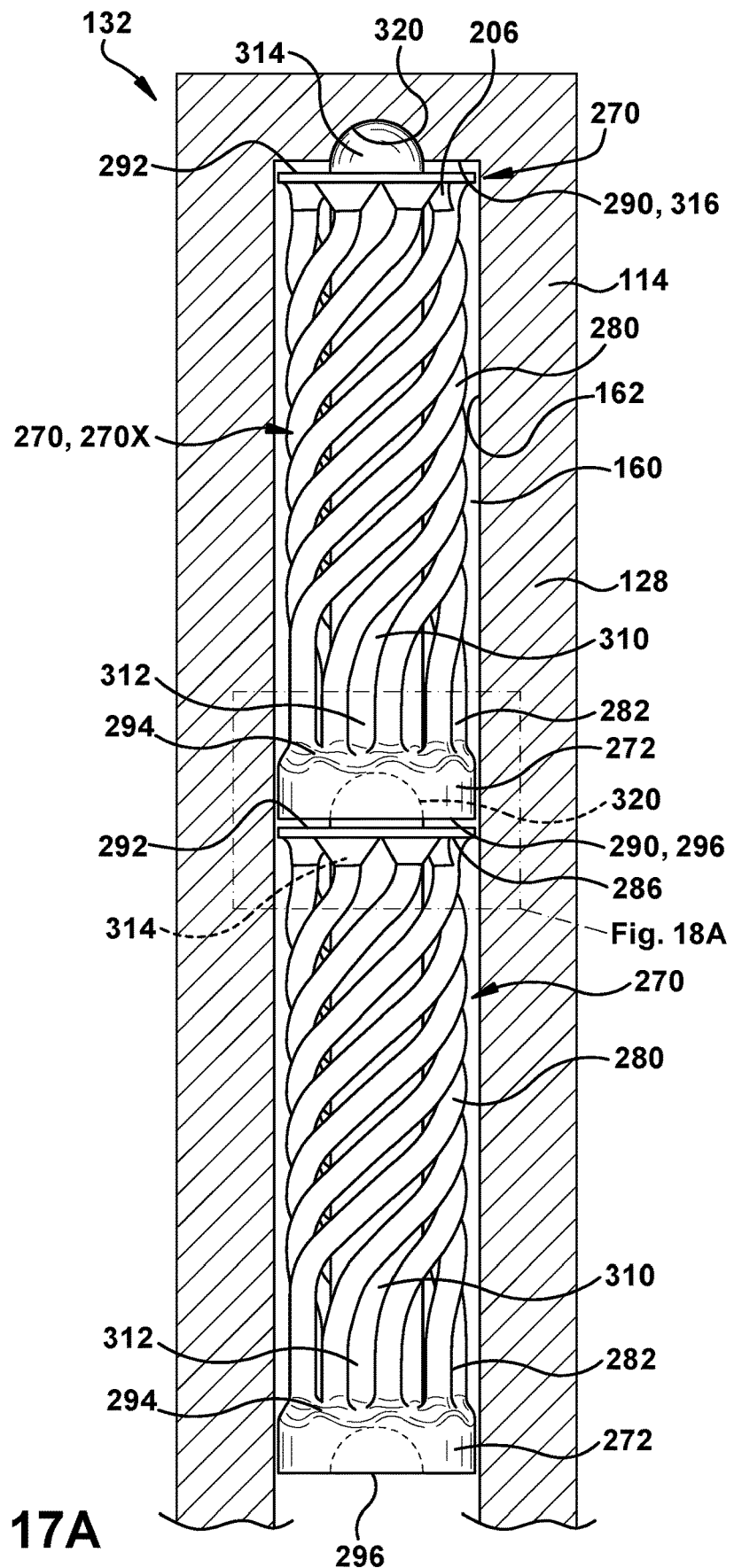
FIG. 17A shows a side view of a vibration dampening system including a plurality of damper elements of FIG. 15 in a first position, according to embodiments of the disclosure.
Figure 17B:
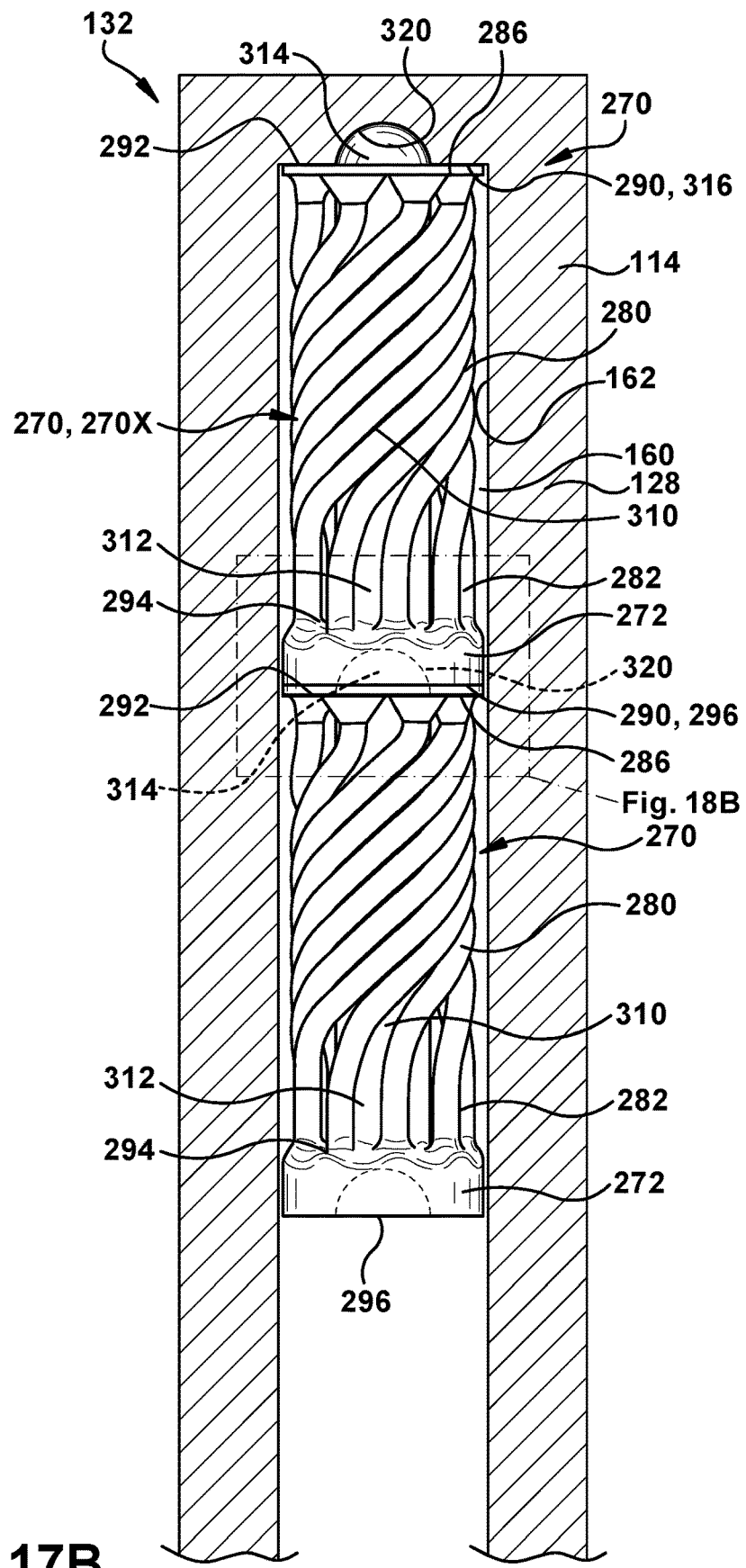
FIG. 17B shows a side view of a vibration dampening system including a plurality of damper elements of FIG. 15 in a second position, according to embodiments of the disclosure.

Vibration dampening system 220 for blades 114 may include a plurality of damper elements 270. Damper element (s) 270 for vibration dampening system 220 is positioned in body opening 160 in rotating blade 114 in turbine 90 (FIG. 1). FIG. 15 shows a side view, and FIG. 16 shows a perspective view of a damper element 270, according to embodiments of the disclosure. FIG. 17A shows a side view of two stacked damper elements 270 in a first position in body opening 160 of blade 114, and FIG. 17B shows a side view of two stacked damper elements 170 in a second position, according to embodiments of the disclosure. As shown in FIGS. 15 and 16, each damper element 270 may include a base member 272 having an axially fixed position within body opening 160 (FIGS. 17A-B). Base member 272 may have a cross-sectional shape configured to match that of body opening 160, e.g., circular or other shape. Base member 272 does not engage body opening 160. Base member 272 may include a first side 294 and a second side 296.

Damper element 270 also includes a spring-suspended bearing member 274. In FIGS. 15, 16, 17A-B, spring-suspended bearing member 274 includes a spring 280 fixedly coupled to base member 272 at a first end 282 of spring 280 and a bearing member 286 coupled to a second end 288 of spring 280. Bearing member 286 may include any element capable of frictionally engaging a first bearing surface 290 to dampen vibration. In the example shown, bearing member 286 includes a circular plate having a surface 292. As will be described, first bearing surface 290 with which bearing member 286 frictionally engages can vary depending on the location of a particular damper element 270 in the stack.

In FIGS. 15, 16, 17A-B and 18A-B, spring 280 includes a plurality of partially helical coils 300 extending from first side 294 of base member 272 to bearing member 286. Each partially helical coil 300 includes a first end 302 coupled to first side 294 of base member 272 at a first circumferential location relative to a center axis CA of base member 272 and a second end 304 coupled to bearing member 286 at a second circumferential location relative to center axis CA of base member 272 that is different than the first circumferential location. In this manner, each coil 300 provides a partially helical coil in that they extend in a helical manner, but only part of 360° around center axis CA of base member 286. First end 302 of each partially helical coil 300 may be coupled to first side 294 of base member 272 at a perpendicular angle, and second end 304 of each partially helical coil 300 may be coupled to bearing member 286 at a perpendicular angle. Other angles are also possible. Any number of helical coils 300 having any cross-sectional shape and/or dimensions can be used to create the desired spring constant for spring 280. Spring 280 allows bearing member 286 to move radially relative to a turbine axis within body opening 160 in rotating blade 114 to counteract a centrifugal force CF (FIGS. 17B, 18B) on rotating blade 114. While a particular partially helical spring 280 has been disclosed herein, it is understood that other forms of spiral spring may also be provided.

Damper element 270 may also include a positioning member 310 having a first end 312 and a second end 314. Positioning member 310 positions damper elements 270 relative to one another in a stack and the stack relative to body opening 160. Positioning members 310 also fix a position of damper element(s) 270 relative to body opening 160, e.g., through the sequential positioning of each damper element 270 relative to one another and the stack overall relative to an end surface 316 (FIGS. 17A-18B) of body opening 160. (Note, FIGS. 17A-B and 18A-B show end surface 316 in tip end 132 based on the FIG. 13 embodiment with closure member 164 (not shown) in base end 130 of rotating blade 114. Where, as in FIG. 14, closure member 166 is used in tip end 132 of rotating blade 114, at least part of end surface 316 of body opening 160 may be provided by closure 166.) Positioning member 310 is coupled to and extends from first side 294 of base member 272 at first end 312 of positioning member 310. Positioning member 310 extends adjacent spring 280. More particularly, positioning member 310 may extend within and be surrounded by spring 280.

As shown in FIGS. 17A-B, for all but a radially outermost damper element 270X, first bearing surface 290 upon which bearing member 286 frictionally engages may be second side 296 of base member 272. This first friction-based vibration dampening interface occurs under partial/reduced influence of centrifugal force CF of rotating blade 114, reduced due to the counteracting force Kx (FIG. 10) of spring 280. In addition, for all but a radially outermost damper element 270X, second end 314 of positioning member 310 is configured to frictionally engage with a second bearing surface 320 on second side 296 of base member 272 to dampen vibration. This second friction-based vibration dampening interface occurs under the full centrifugal force CF of rotating blade 114, transmitted through stacked positioning member(s) 310. Second bearing surface 320 can be any surface on second side 296 of base member 272 configured to mate with second end 314 of positioning member 310. In the examples shown, second bearing surface 320 includes a concave surface configured to mate with a convex surface of second end 314 of positioning member 310, e.g., mating domed shapes. As noted relative to the previous embodiment, other mating surface shapes are also possible.

For radially outermost damper element 270X, first bearing surface 290 may be any part of end surface 316 of body opening 160 upon which bearing member 286 frictionally engages, i.e., surface 292 of bearing member 286. Similarly, for radially outermost damper element 270X, second bearing surface 320 upon which second end 314 of positioning member 310 frictionally engages may be part of end surface 316 of body opening 160 having, for example, a concave surface to mate with second end 314 of positioning member 310 of radially outermost damper element 270X. As noted relative to the previous embodiment, other mating surface shapes are also possible.

Figure 18A:
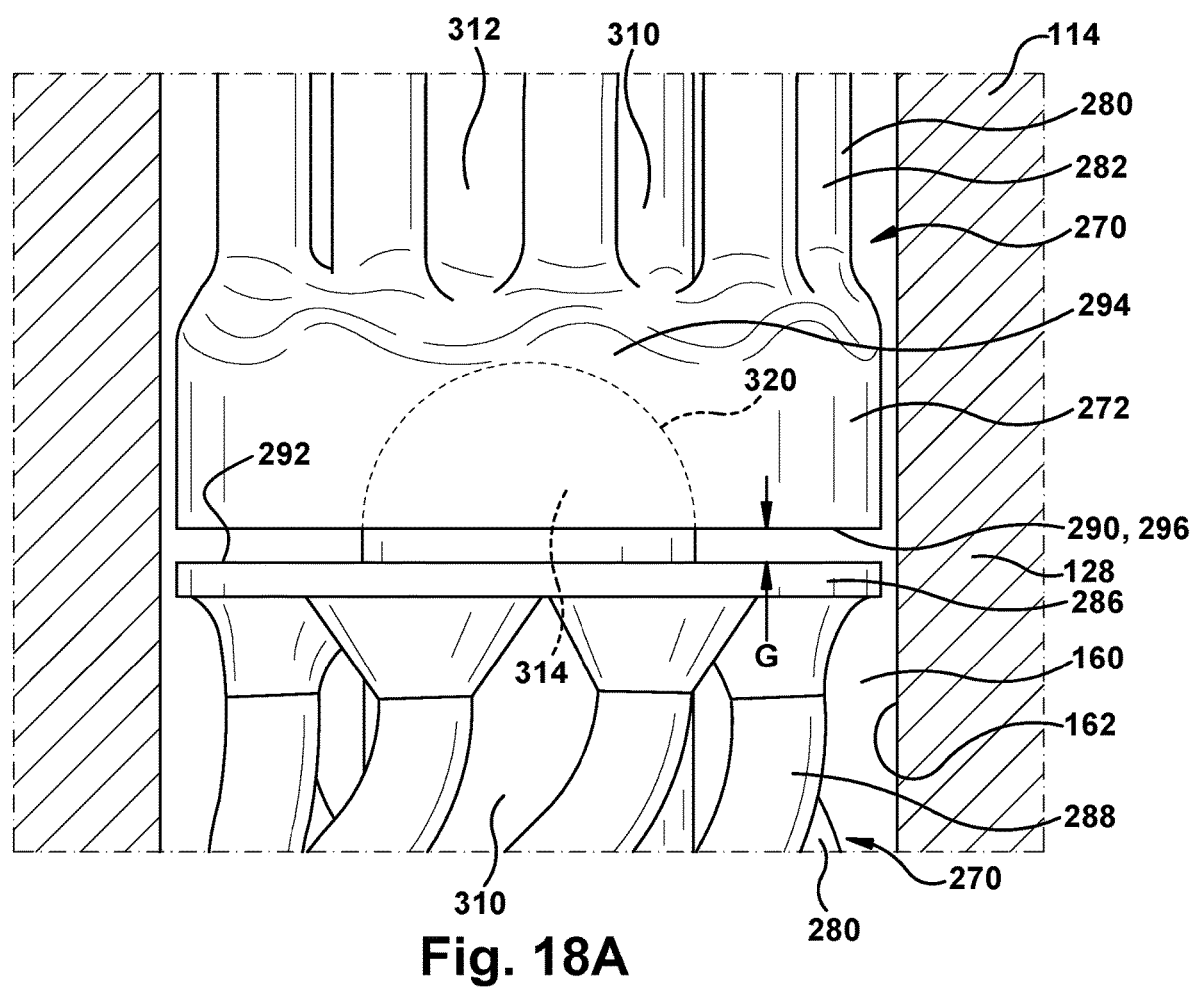
FIG. 18A shows an enlarged side view of a vibration dampening system including a plurality of damper elements of FIG. 15 in a first position, according to embodiments of the disclosure.

As shown in FIGS. 17A and 18A, positioning member(s) 310 has a length configured to axially fix the position of respective base member(s) 272 within body opening 160. Spring 280 (in conjunction with positioning members 310) positions bearing member 286 in one of two positions dictated by the rotational speed of rotating blade 114. In a first position, spring 280 positions bearing member 286 at a distance (i.e., gap G) from first bearing surface 290 with rotating blade 114 rotating at lower than the predefined rotational speed and spring 280 in a not-fully extended state. A "not-fully extended state" of spring 280 may be a relaxed state in which spring 280 is not extended (as occurs when rotating blade 114 is not rotating) or a partially extended state in which spring 280 is partially extended (as occurs when rotating blade 114 has sufficient rotational speed to create a centrifugal force CF to cause spring 280 to partially extend but not enough to have bearing member 286 frictionally engage first bearing surface 290).

In this position, bearing member 286 (surface 292 thereof) does not engage first bearing surface 290 when rotating blade 114 is not rotating or is not rotating at a rotational speed higher than the predefined rotational speed sufficient to generate centrifugal force CF adequate to direct bearing member 286 into frictional engagement with first bearing surface 290. In this situation, spring 280 is in a not-fully extended state such that gap G exists between bearing member 286 and first bearing surface 290, i.e., on second side 296 of an adjacent base member 272 or on end surface 316 of body opening 160. However, in this situation, second ends 314 of positioning members 310 are still configured to frictionally engage with a second bearing surface 320 on second side 296 of base member 272 or inner surface 162 of body opening 160 to dampen vibration.

Figure 18B:
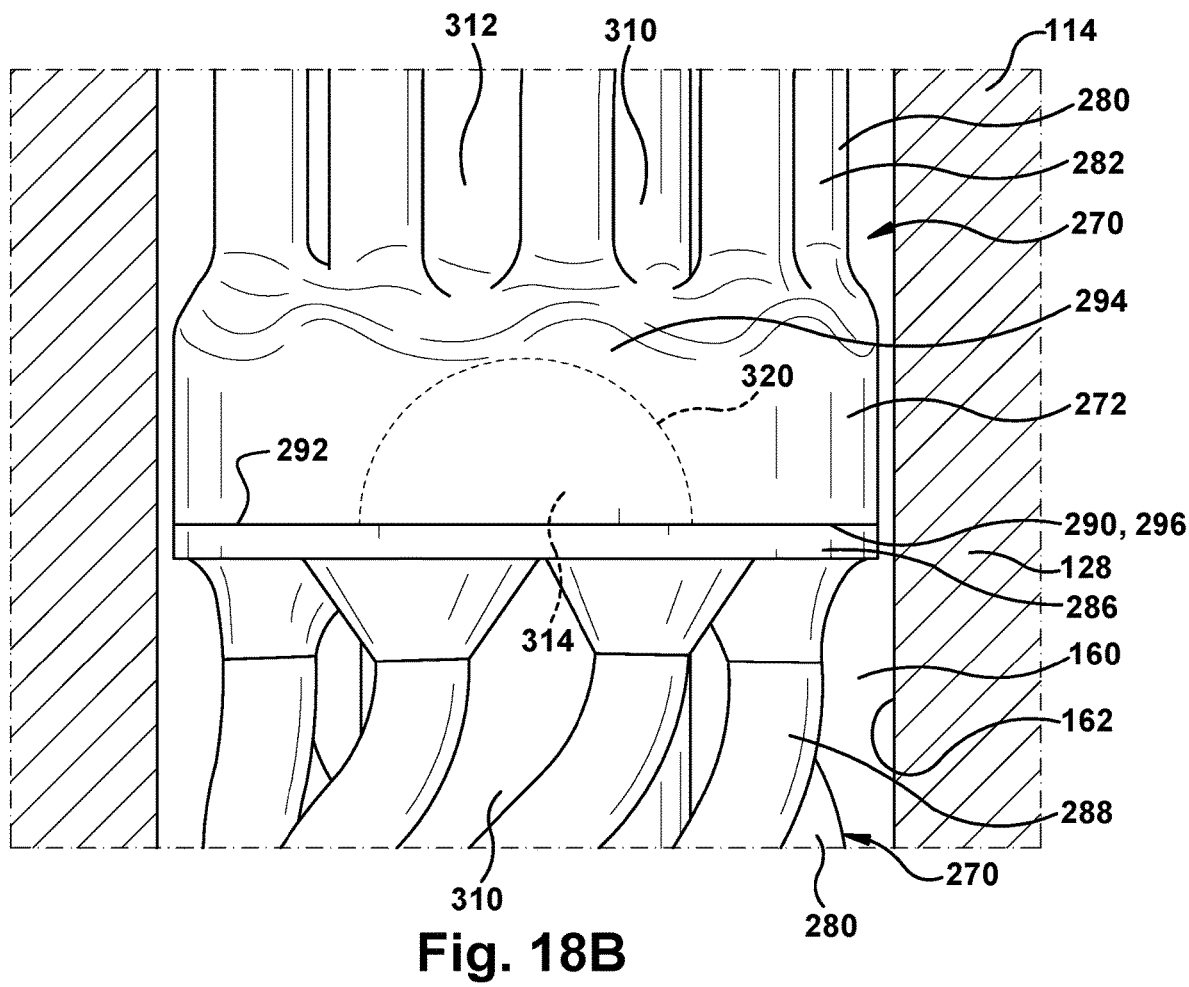
FIG. 18B shows an enlarged side view of a vibration dampening system including a plurality of damper elements of FIG. 15 in a second position, according to embodiments of the disclosure.

In contrast, in a second position (as shown in FIGS. 17B and 18B), spring 280 positions bearing member 286 frictionally engaging first bearing surface 290 to dampen vibration with rotating blade 114 rotating at higher than the predefined rotational speed and spring 280 in an elastically extended state. In this situation, once rotating blade 114 has a rotational speed greater than the predefined rotational speed, a sufficient centrifugal force CF is created to force base member 286 into frictional engagement with first bearing surface 290 to dampen vibration. As described relative to FIG. 10, spring 280 reduces the amount of rotational speed and related centrifugal force CF required to achieve frictional engagement and vibration dampening by the interface between bearing member 286 and first bearing surface 290. An "elastically extended state" indicates spring 280 has extended sufficiently to have bearing member 286 frictionally engaging first bearing surface 290, but may not be fully extended due to the travel distance of bearing member 286 being limited by first bearing surface 290. Also, in this situation, second ends 314 of positioning members 310 are still configured to frictionally engage with a second bearing surface 320 on second side 296 of base member 272 or end surface 316 of body opening 160 to dampen vibration. However, should the centrifugal force CF be sufficient to prevent operation of this second friction-based vibration dampening interface, i.e., by applying so much force that frictional movement is prevented, the first friction-based vibration dampening interface between bearing members 286 and first bearing surfaces 290 remains operative.

Damper elements 270 are stacked together in body opening 160. FIGS. 17A-B and 18A-B show two damper elements 270 stacked in body opening 160. Any number of damper elements 270 may be stacked in body opening 160. FIGS. 17A and 18A show damper elements 270 in a (first) position in which blade 114 is not rotating or is rotating at a rotational speed w that is lower than a predefined rotational speed at which damper elements 270 are operative. In this position, springs 280 (helical coils 300) are in a not-fully extended state, and a gap G exists between bearing member 286 and first bearing surface 290 (e.g., second side 296 of base member 272 or end surface 316 of body opening 160).

In contrast, FIGS. 17B and 18B shows damper elements 270 in a (second) position in which springs 280 (helical coils 300) are in an elastically extended state under influence of a centrifugal force CF caused by rotation of rotating blade 114 at higher than a predefined rotational speed. In this position, springs 280 are extended radially outwardly, causing gap G to disappear, and causing bearing members 286 to frictionally engage respective first bearing surfaces 290 to dampen vibration. As shown, for stacked damper elements 270 other than a radially outermost damper element 270X, first bearing surface 290 may be second side 296 of an adjacent damper element's base member 272. That is, first bearing surface 290 includes second side 296 of base member 272 opposite from first side 294. Here, surface 292 of bearing member 286 frictionally engages second side 296 of base member 272 of an adjacent damper element 270 to dampen vibration. For radially outermost damper element 270X, surface 292 of bearing member 286 frictionally engages first bearing surface 290 that is part of an end surface 316 of body opening 160. Positioning member 310 of radially outermost damper element 270X may also have second end 314 thereof mate with a mating second bearing surface 320 in end surface 316 of body opening 160 to dampen vibration.

A spring constant of spring 280 (helical coils 300) and a collective mass of bearing member 286 and spring 280 are configured to allow movement of spring 280 into frictional engagement with first bearing surface 290 (FIGS. 17B, 18B) from a position out of engagement (FIGS. 17A, 18A) with first bearing surface 290 in response to centrifugal force CF caused by rotation of rotating blade 114 at higher than the predefined rotational speed. As previously explained relative to FIG. 10, the rotational speed co for a given rotating blade 114 creates a particular centrifugal force CF, i.e., gravitational force equivalent (g-force), on rotating blade 114. As rotating blade 114 rotates at rotational speed co, it also creates a lateral vibratory force VF. A friction force FF that resists vibration dampening of parts of damper element 270 is equal to the reaction force R times a friction coefficient μ of the relevant frictionally engaging surfaces (e.g., 190 and 296 or 316), i.e., FF=μR or FF=μCF. If damper element 270 is to have frictional vibration dampening occur between surfaces thereof, e.g., first bearing surface 290 and bearing member 286, the surfaces need to slide back and forth to dampen vibration. In order for this to occur, vibratory force VF must be greater than friction force FF, i.e., VF>FF. Hence, vibratory force VF must be greater than a product of the centrifugal force CF and a friction coefficient μ of the surfaces, i.e., VF>μCF.

Spring 280 in damper elements 270, according to embodiments of the disclosure, creates a reactive force Kx that constructively reduces centrifugal force CF (and reactionary force R) to reduce the amount of vibratory force VF required to start vibration dampening. That is, spring 280 reduces the force between vibration dampening surfaces (e.g., first bearing surface 290 and bearing member 286) to reduce the amount of vibratory force VF required to begin vibration dampening. Damper elements 270 can be custom sized to operate at different centrifugal forces CF, radii location, vibration frequency, and rotational speed, among other factors.

In certain embodiments, base member 272, spring 280, and bearing member 286 (and positioning member 310) are additively manufactured and integrally coupled. In other embodiments, base member 272, spring 280, and bearing member 286 may be separately formed and fixedly coupled together using any now known or later developed process, e.g., welding, brazing, fasteners, etc.

Any number of damper elements 170, 270 may be used in vibration dampening system 120 depending on, among other factors, the length of blade 114, desired vibration dampening, and/or available space. As described, an endmost one of damper elements 170X, 270X in a stack may abut an end surface 210, 316 of body opening 160, see e.g., FIGS. 11B, 17B and 18B. Alternatively, as shown in FIGS. 5 and 14, part of end surfaces 210, 316 may be provided by closure member 166.

In addition to the two forms of vibration dampening previously described, vibration dampening may also occur by frictional engagement of outer dimensions of parts of damper elements 170, 270 with an inner dimension of inner surface 162 of body opening 160 in blade 114. For example, in FIGS. 11A, 11B, outer surfaces of bearing member 186 and/or disc spring 180 may frictionally engage inner surface 162 of body opening 160 to dampen vibration. In another example, in FIGS. 17A-B, outer surfaces of bearing member 286, spring 280, and/or base member 272 may frictionally engage inner surface 162 of body opening 160 to dampen vibration.

As noted herein, damper elements 170, 270 can be manufactured in any now known or later developed fashion. For example, damper elements 170, 270 can be cast, and the parts can be assembled, e.g., by welding or otherwise fastening of the parts together. In other embodiments, damper elements 170, 270 can be additively manufactured. Any form of additive manufacture appropriate for the materials used can be employed, such as but not limited to direct metal laser melting (DMLM).

Embodiments of the disclosure provide various technical and commercial advantages, examples of which are discussed herein. Vibration dampening system 120 reduces blade vibration with a simple arrangement and does not add much extra mass to blade 114. Vibration dampening system 120 does not increase centrifugal force to tip end 132 of blade 114 or require a change in blade 114 configuration. One or more damper elements 170, 270 can be used. Damper elements 170, 270 include a first friction-based vibration dampening interface that dampens vibration when blade 114 experiences the full centrifugal force of normal rotational speed of blade 114. Advantageously, one or more damper elements 170, 270 may also provide a second friction-based vibration dampening interface whose frictional engagement dampens vibration when blade 114 experiences a constructively reduced centrifugal force (e.g., at a reduced rotational speed). This latter vibration dampening can occur at rotational speeds less than a full-load rotational speed of the turbine. For example, the vibration dampening can occur during acceleration of the rotating blade, e.g., early in a turbine startup process, and deceleration of the rotating blade, e.g., during a turbine shutdown process. This latter vibration dampening may occur despite the other vibration dampening interface being inoperative due to the centrifugal force making it inoperative.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and their practical application and to enable others of ordinary skill in the art to understand the disclosure for various embodiments with various modifications as are suited to the particular use contemplated.

What is claimed is:

1. A damper element for a vibration dampening system in a body opening in a rotating blade in a turbine, the damper element comprising:
    a base member having an axially fixed position within the body opening; and
    a spring-suspended bearing member having a spring fixedly coupled to the base member at a first end of the spring and a bearing member coupled to a second end of the spring;
    wherein the spring is configured to achieve an elastically extended state under influence of a centrifugal force caused by rotation of the rotating blade at higher than a predefined rotational speed, and wherein the elastically extended state of the spring causes the bearing member to frictionally engage a first bearing surface to dampen vibration, and wherein the base member has a first side and a second side, and the spring includes a plurality of partially helical coils extending from the first side of the base member to the bearing member.

2. The damper element of claim 1, wherein a spring constant of the spring and a collective mass of the bearing member and the spring are configured to allow movement of the bearing member into frictional engagement with the first bearing surface from a position out of engagement with the first bearing surface in response to the centrifugal force caused by rotation of the rotating blade at higher than the predefined rotational speed.

3. The damper element of claim 1, wherein each partially helical coil includes a first end coupled to the first side of the base member at a first circumferential location relative to a center axis of the base member, and a second end coupled to the bearing member at a second circumferential location relative to the center axis of the base member that is different than the first circumferential location.

4. The damper element of claim 3, wherein the first end of each partially helical coil is coupled to the first side of the base member at a perpendicular angle, and the second end of each partially helical coil is coupled to the bearing member at a perpendicular angle.

5. The damper element of claim 1, further comprising a positioning member having a first end and a second end, the positioning member coupled to and extending from the first side of the base member at the first end of the positioning member, the positioning member extending adjacent the spring.

6. The damper element of claim 5, wherein the damper element is a first damper element of a plurality of identical damper elements arranged in a stacked configuration; wherein the first bearing surface engaged by the bearing member of the first damper element is on the second side of the base member of an adjacent damper element, and wherein the second end of the positioning member is configured to frictionally engage with a second bearing surface on the second side of the base member of the adjacent damper element to dampen vibration.

7. The damper element of claim 6, wherein the positioning member is configured to axially fix the position of the base member within the body opening relative to adjacent damper elements of the plurality of damper elements, and the spring positions the bearing member:
    at a distance from the first bearing surface of the adjacent damper element with the rotating blade rotating at lower than the predefined rotational speed and the spring in a not-fully extended state; and
    frictionally engaging the first bearing surface of the adjacent damper element to dampen vibration with the rotating blade rotating at higher than the predefined rotational speed and the spring in the elastically extended state.

8. The damper element of claim 1, wherein the first bearing surface is located on one of: a side of the base member of an adjacent damper element and an end surface of the body opening in the rotating blade.

9. The damper element of claim 1, wherein the base member, the spring, and the bearing member are additively manufactured and integrally coupled.

10. A vibration dampening system for a rotating blade of a turbine, the vibration dampening system comprising:
    a plurality of stacked damper elements for positioning in a body opening defined in the rotating blade, each damper element including:
    a base member having an axially fixed position within the body opening; and
    a spring-suspended bearing member having a spring fixedly coupled to the base member at a first end of the spring and a bearing member coupled to a second end of the spring;
    wherein, with the spring in an elastically extended state under influence of a centrifugal force caused by rotation of the rotating blade at higher than a predefined rotational speed, the bearing member frictionally engages a first bearing surface to dampen vibration.

11. The vibration dampening system of claim 10, wherein a spring constant of the spring and a collective mass of the bearing member and the spring are configured to allow movement of the bearing member into frictional engagement with the first bearing surface from a position out of engagement with the first bearing surface in response to the centrifugal force caused by rotation of the rotating blade at higher than the predefined rotational speed.

12. The vibration dampening system of claim 10, wherein the base member has a first side and a second side, and the spring includes a plurality of partially helical coils extending from the first side of the base member to the bearing member.

13. The vibration dampening system of claim 12, wherein each partially helical coil includes a first end coupled to the first side of the base member at a first circumferential location relative to a center axis of the base member, and a second end coupled to the bearing member at a second circumferential location relative to the center axis of the base member that is different than the first circumferential location.

14. The vibration dampening system of claim 13, wherein the first end of each partially helical coil is coupled to the first side of the base member at a perpendicular angle, and the second end of each partially helical coil is coupled to the bearing member at a perpendicular angle.

15. The vibration dampening system of claim 10, wherein each damper element further comprises a positioning member having a first end and a second end, the positioning member coupled to and extending from a first side of the base member at the first end of the positioning member, the positioning member extending adjacent the spring.

16. The vibration dampening system of claim 15, wherein the first bearing surface frictionally engaged by a first damper element is on a second side of the base member of a second adjacent damper element opposite the first side of the base member of the second adjacent damper element, and wherein the positioning member of the first damper element is configured to frictionally engage with a second bearing surface of the second adjacent damper element on the second side of the base member of the second adjacent damper element to dampen vibration, the positioning member of the first damper element axially fixing the position of the base member of the second adjacent damper element within the body opening and the spring of the first damper element positioning the bearing member of the first damper element:
   at a distance from the first bearing surface with the rotating blade rotating at lower than the predefined rotational speed and the spring in a not-fully extended state; and
   frictionally engaging the first bearing surface to dampen vibration with the rotating blade rotating at higher than the predefined rotational speed and the spring in the elastically extended state.

17. The vibration dampening system of claim 10, wherein the first bearing surface is located on one of a side of the base member of an adjacent damper element and an end surface of the body opening in the rotating blade.

18. A vibration dampening system for a rotating blade in a turbine, the vibration dampening system comprising:
   a plurality of stacked damper elements for positioning in a body opening defined in the rotating blade, each damper element including:
      a base member having a first side and a second side;
      a spring having a first end and a second end, the spring coupled to the first side of the base member at the first end of the spring;
      a bearing member coupled to the second end of the spring; and
      a positioning member having a first end and a second end, the positioning member coupled to the first side of the base member at the first end of the positioning member and extending adjacent the spring, and
   wherein the spring positions the bearing member:
      at a distance from a first bearing surface with the rotating blade rotating at lower than a predefined rotational speed and the spring in a not-fully extended state; and
      frictionally engaging the first bearing surface to dampen vibration with the spring in an elastically extended state under influence of a centrifugal force caused by rotation of the rotating blade at higher than the predefined rotational speed.

19. The vibration dampening system of claim 18, wherein, for all damper elements except a radially outermost damper element of the plurality of stacked damper elements in the body opening, the first bearing surface includes the second side of the base member of an adjacent damper element.

20. The vibration dampening system of claim 19, wherein, for the radially outermost damper element of the plurality of stacked damper elements in the body opening, the first bearing surface includes an end surface of the body opening defined in the rotating blade.

* * * * *